US 6,639,631 B1

(12) United States Patent
Hall, Jr. et al.

(10) Patent No.: US 6,639,631 B1
(45) Date of Patent: *Oct. 28, 2003

(54) PROJECTION TELEVISION USING A HOLOGRAPHIC SCREEN

(75) Inventors: Estill Thone Hall, Jr., Fishers, IN (US); Wendy Rene Pfile, Indianapolis, IN (US); Eugene Murphy O'Donnell, Fishers, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,489

(22) PCT Filed: Jan. 29, 1998

(86) PCT No.: PCT/US98/01751

§ 371 (c)(1), (2), (4) Date: Jul. 12, 1999

(87) PCT Pub. No.: WO98/33329

PCT Pub. Date: Jul. 30, 1998

Related U.S. Application Data

(63) Continuation-in-part of application No. 08/777,887, filed on Dec. 31, 1996, now Pat. No. 6,078,351.

(51) Int. Cl.[7] .................................................. H04N 9/31
(52) U.S. Cl. ........................ 348/744; 348/756; 348/779; 348/40; 348/41; 345/6; 345/419; 359/455
(58) Field of Search ................................. 348/744, 745, 348/746, 750, 756, 758, 778, 779, 806, 807, 808, 40, 41, 656, 42, 51, 52; 359/1, 455, 443, 449, 456, 458, 457, 460; 345/6, 206, 419; H04N 9/73, 9/31, 9/28

(56) References Cited

U.S. PATENT DOCUMENTS

| 5,046,793 A | 9/1991 | Hockley et al. ............... 359/12 |
| 5,206,761 A | 4/1993 | Ogino ........................ 359/457 |
| 6,078,351 A | * 6/2000 | Hall et al. ..................... 348/40 |

FOREIGN PATENT DOCUMENTS

| EP | 0349947 | 1/1990 | ............ G02B/5/02 |
| EP | 0479490 | 4/1992 | ............ G02B/5/32 |
| EP | 0629899 | 12/1994 | ............ G03B/21/62 |
| JP | 06-082625 | 3/1994 | ............ G02B/5/32 |
| WO | 95/34832 | 12/1995 | ............ G02B/5/32 |
| WO | 96/07953 | 3/1996 | ............ G03B/21/62 |

OTHER PUBLICATIONS

*Patent Abstracts of Japan, vol. 18, No. 333, Jun. 23, 1994 & JP 06–082625.

* cited by examiner

Primary Examiner—Sherrie Hsia
(74) Attorney, Agent, or Firm—Joseph S. Tripoli; Joseph J. Laks; Harvey D. Fried

(57) ABSTRACT

A projection television receiver having red, green and blue image projectors for respective images of different colors and a high gain projection screen formed by at least one hologram disposed on a substrate superimposed on at least one light transmissive panel. The high gain holographic screen provides increased horizontal viewing performance over lenticular (e.g., fresnel) screens without reliance on screens having wide horizontal half viewing angles.

25 Claims, 22 Drawing Sheets

| POINT | % CTR W/O OBJECT | % CTR WITH OBJECT | % IMPROVEMENT |
|---|---|---|---|
| 3 O'CLOCK | 28 | 34 | 21 |
| 9 O'CLOCK | 22 | 27 | 23 |
| 6 O'CLOCK | 33 | 43 | 30 |
| 12 O'CLOCK | 41 | 51 | 24 |
| 2 O'CLOCK CORNER | 9 | 11 | 22 |
| 4 O'CLOCK CORNER | 6 | 8 | 33 |
| 8 O'CLOCK CORNER | 5 | 7 | 40 |
| 10 O'CLOCK CORNER | 8 | 9 | 12 |

PROJECTION TELEVISION USING A HOLOGRAPHIC SCREEN

This is a continuation-in-part of application Ser. No. 08/777,887, filed Dec. 31, 1996, and now U.S. Pat. No. 6,078,351 issued Jun. 20, 2000.

BACKGROUND

1. Field of the Invention

This invention relates generally to the field of projection television receivers, and in particular to projection television receivers having screens providing improved visibility at wide horizontal viewing angles. A holographic screen is provided with a high gain, resulting in a substantially higher brightness when viewed at an angle normal to the screen than when viewed at an angle displaced from normal in a horizontal plane. This characteristic generally is considered undesirable in a projection television; however by employing a high gain holographic screen, the brightness is acceptable for viewing at a wide viewing angle, and can exceed the brightness of a conventional screen out to ±50° from normal.

2. Background Information

Design of a projection television system involves many choices of design criteria that affect color shift and various other brightness characteristics.

Projection television screens need at least three image projectors to form respective images of different colors, for example, red, blue and green. A projection screen receives images from the three projectors on a first side and displays the images on a second side with controlled light dispersion of all the displayed images. One of the projectors, usually green- and usually in the center of an array of projectors, has a first optical path in a substantially orthogonal orientation with the screen. At least two of the projectors, usually red and blue and usually positioned on opposite sides of the central green projector in the array, have respective optical paths converging toward the first optical path in a non orthogonal orientation relative to the screen, defining angles of incidence. As a result of this positioning scheme for the projectors, the image appearing on the screen is color shifted when viewed from different angles and the image is brighter at the center of the screen than at the edges of the screen or exhibits non-uniform brightness. It would be advantageous to reduce color shift and to improve brightness uniformity in projection screen television systems.

Color shift is defined as the change in the red/blue or green/blue ratio of a white image formed at the center of a projection screen by projected images from red, green and blue projection tubes, when viewed at different angles in the horizontal plane, by observations made at the peak brightness vertical viewing angle.

The color shift problem is caused by the need for at least three image projectors for respective images of different colors, for example, red, blue and green. A projection screen receives images from the at least three projectors on a first side and displays the images on a second side with controlled light dispersion of all the displayed images. One of the projectors, usually green and usually in the center of an array of projectors, has a first optical path in a substantially orthogonal orientation with the screen. At least two of the projectors, usually red and blue and usually positioned on opposite sides of the central green projector in the array, have respective optical paths converging toward the first optical path in a non orthogonal orientation defining angles of incidence. Color shift results from the non orthogonal relationship of the red and blue projectors, relative to the screen and to the green projector. As a result of the color shift, color tones may differ at every position on the screen. The condition in which the color tone difference is large is often referred to as poor white uniformity. The smaller the color shift, the better the white uniformity.

Color shift is denoted by a scale of numbers, in which lower numbers indicate less color shift and better white uniformity. In accordance with a common procedure, values for the red, green and blue luminance are measured at the screen center from a variety of horizontal viewing angles, typically from at least about −40° to +40°, to as much as about −60° to +60°, in 5° or 10° increments. The positive and negative angles represent horizontal viewing angles to the right and left of screen center, respectively. These measurements are taken at the peak vertical viewing angle. The red, green and blue data is normalized to unity at 0°. One or both of the following equations (I) and (II) are evaluated at each angle:

$$C(\Theta) = 20 \cdot \log_{10}\left(\frac{red(\Theta)}{blue(\Theta)}\right); \tag{I}$$

$$C(\Theta) = 20 \cdot \log_{10}\left(\frac{green(\Theta)}{blue(\Theta)}\right) \tag{II}$$

where $\theta$ is any angle within a range horizontal viewing angles, $C(\theta)$ is the color shift at angle $\theta$, $red(\theta)$ is the red luminance level at angle $\theta$, $blue(\theta)$ is the blue luminance level at angle $\theta$ and $green(\theta)$ is the green luminance level at angle $\theta$. The maximum of these values is the color shift of the screen.

In general, color shift-should be no larger than 5, nominally, on any commercially acceptable screen design. Other engineering and design constraints may sometimes require that the color shift be somewhat higher than 5, although such color shift performance is not desirable and usually results in a perceptibly inferior picture with poor white uniformity.

Screens for projection television receivers are generally manufactured by an extrusion process utilizing one or more patterned rollers to shape the surface of a thermoplastic sheet material. The configuration is generally an array of lenticular elements, also referred to as lenticules and lenslets. The lenticular elements may be formed on one or both sides of the same sheet material or on one side only of different sheets which can then be permanently combined as a laminated unit or otherwise mounted adjacent to one another so as to function as a laminated unit. In many designs, one of the surfaces of the screen is configured as a Fresnel lens to provide light diffusion. Prior art efforts to reduce color shift and improve white uniformity have focused exclusively on two aspects of the screen. One aspect is the shape and disposition of the lenticular elements. The other aspect is the extent to which the screen material, or portions thereof, are doped with light diffusing particles to control light diffusion. These efforts are exemplified by the following patent documents.

In U.S. Pat. No. 4,432,010 and U.S. Pat. No. 4,536,056, a projection screen includes a light-transmitting lenticular sheet having an input surface and an exit surface. The input surface is characterized by horizontally diffusing lenticular profiles having a ratio of a lenticulated depth Xv to a close-axis-curvature radius R1 (Xv/R1) which is within the range of 0.5 to 1.8. The profiles are elongated along the optical axis and form aspherical input lenticular lenses.

The use of a screen with a double sided lenticular lens is common. Such a screen has cylindrical entrance lenticular elements on an entrance surface of the screen, cylindrical lenticular elements formed on an exit surface of the screen and a light absorbing layer formed at the light non convergent part of the exit surface. The entrance and the exit lenticular elements each have the shape of a circle, ellipse or hyperbola represented by the following equation (III):

$$Z(x) = \frac{Cx^2}{1 + [1 - (K+1)C^2x^2]^{\frac{1}{2}}} \qquad (III)$$

wherein C is a main curvature and K is a conic constant.

Alternatively, the lenslets have a curve to which a term with a higher order than 2nd order has been added.

In screens making use of such a double sided lenticular lens, it has been proposed to specify the position relationship between the entrance lens and exit lens, or the lenticular elements forming the lenses. It has been taught, for example in U.S. Pat. No. 4,443,814, to position the entrance lens and exit lens in such a way that the lens surface of one lens is present at the focal point of the other lens. It has also been taught, for example in JP 58-59436, that the eccentricity of the entrance lens be substantially equal to a reciprocal of the refractive index of the material constituting the lenticular lens. It has further been taught, for example in U.S. Pat. No. 4,502,755, to combine two sheets of double-sided lenticular lenses in such a way that the optic axis planes of the respective lenticular lenses are at right angles with respect to one another, and to form such double sided lenticular lenses in such a way that the entrance lens and exit lens at the periphery of one of the lenses are asymmetric with respect to the optic axis. It is also taught, in U.S. Pat. No. 4,953,948, that the position of light convergence only at the valley of an entrance lens should be offset toward the viewing side from the surface of an exit lens so that the tolerance for misalignment of optic axes and the difference in thickness can be made larger or the color shift can be made smaller.

In addition to the problem of color shift, projection televisions may fail to provide an image which is sufficiently bright through a sufficient range of horizontal viewing angles from which users may view the screen. Most attempts at improving brightness have focused on improving the overall screen gain which is defined as the quotient of light intensity directed from the source toward the rear of the viewing surface, and the light intensity from the front of the viewing surface toward the viewer, measured orthogonal or normal to the screen.

In addition to the various proposals for decreasing the color shift or white non uniformity, other proposals for improving projection screen performance are directed to brightening pictures and ensuring appropriate visual fields in both the horizontal and vertical directions. A summary of many such proposals can be found in U.S. Pat. No. 5,196,960, which itself teaches a double sided lenticular lens sheet comprising an entrance lens layer having an entrance lens, and an exit lens layer having an exit lens whose lens surface is formed at the light convergent point of the entrance lens, or in the vicinity thereof, wherein the entrance lens layer and the exit lens layer are each formed of a substantially transparent thermoplastic resin and at least the exit layer contains light diffusing fine particles and wherein a difference exists in the light diffusion properties between the entrance lens layer and the exit lens layer. A plurality of entrance lenses comprise a cylindrical lens. The exit lens is formed of a plurality of exit lens layers, each having a lens surface at the light convergent point of each lens of the entrance lens layer, or in the vicinity thereof. A light absorbing layer is also formed at the light non convergent part of the exit lens layer. This screen design is said to provide sufficient horizontal visual field angle, decreased color shift and a brighter picture, as well as ease of manufacture by extrusion processes.

Although the overall gain and brightness of a lenticular screen is better than that of a simple diffuse screen, another performance issue of a projection television design is the relative difference in brightness between the screen edges and the screen center under comparable degrees of illumination. Typically the picture at the corners is not as bright as at the center of the picture. The difference in relative brightness occurs partly because the optical path is shorter from the projectors to the center of the screen than from the projectors to the edges of the screen. The difference also occurs partly because the projectors are generally oriented toward the center of the screen, their beams typically converging at the center. The projectors thus illuminate the edges and corners both with less light intensity (due to distance) and less directly than at the center.

Several additional brightness problems occur due to the nature of projection systems. One of the common performance issues of a projection television design is the relative difference in brightness between the screen edges and the screen center under comparable degrees of illumination. Typically the picture at the corners is not as bright as at the center of the picture. The difference in relative brightness occurs partly because the optical path is shorter from the projectors to the center of the screen than from the projectors to the edges of the screen. The difference also occurs partly because the projectors are generally oriented toward the center of the screen, their, beams typically converging at the center. The projectors thus illuminate the edges and corners both with less light intensity (due to distance) and less directly than at the center.

One method for dealing with edge brightness is to use a fresnel lens behind the diffuse or lenticular panel of the screen. The fresnel lens is a collimating lens having a focal length equal to the axial distance between the collimating lens and the exit lens pupils of the projectors. The object is to redirect light rays diverging from the projectors such that the rays along the projection axis from each projection tube emerge from the screen parallel to the axis.

A fresnel lens is subdivided into ridges that are progressively more inclined toward the edges of the lens, having a slope substantially equal to the slope of a solid collimating lens, the specific angles of the ridges being chosen such that refraction at the air/glass (or air/plastic) interfaces at the surface of the lens bend the rays in the required direction. In particular, rays diverging from the center axis of the screen are bent inwardly toward the center axis to emerge parallel to the center axis. This requires progressively greater refraction at the edges of the screen and no refraction at the center.

It is known in a conventional projection screen to increase the focal length of the fresnel ridges proceeding outwardly from the center of the picture. Off-axis light rays at the screen edges are bent beyond parallel to the center axis, and are directed somewhat inwardly toward the center axis. This makes the edges of the picture appear brighter provided the screen is viewed along the center axis, but is not helpful for viewing from other positions.

Another brightness variation problem can occur in projection televisions in which a fresnel is arranged to direct light in the direction of a user viewing from a point above the center of the screen, for example in a projection television having a relatively low cabinet. This is accomplished by offsetting the centerline of the fresnel upwardly relative to the center of the screen. Although this can improve relative brightness, especially at the corners, the top of the screen also appears generally brighter than the bottom of the screen.

Despite many years of aggressive developments in projection screen design, the improvements have been incremental at best. Moreover, there has been no success in surpassing certain benchmarks. The angle of incidence defined by the geometric arrangement of the image projectors, referred to as angle a herein, has generally been limited to the range of greater than 0° and less than or equal to about 10° or 11°. The size of the image projectors and/or their optics, makes angles of a close to 0° essentially impossible. In the range of the angles of a less than about 10° or 11°, the best color shift performance which has been achieved is about 5, as determined in accordance with equations (I) and (II). In the range of the angles of greater than about 10° or 11°, the best color shift performance which has been achieved is not commercially acceptable. In fact, projection television receivers having angles of a greater than 10° or 11° are not known to have been marketed.

Small angles of a have a significant and undesirable consequence, namely a very large cabinet depth is needed to house a projection television receiver. The large depth is a direct result of the need to accommodate optical paths having small angles of incidence ($\alpha$). For a given size of the image projectors and optical elements, the angle of incidence can be reduced only by increasing the length of the optical path between the image projectors or their optics and the screen. Techniques for reducing the size of projection television cabinets generally rely on mirrors for folding long optical paths. The color shift success of such efforts is ultimately limited because there is a low limit to the range of possible angles of incidence.

Polaroid Corporation sells a photo polymer designated DMP-128®, which Polaroid Corporation can manufacture as a three dimensional hologram, using proprietary processes. The holographic manufacturing process is described, in part, in U.S. Pat. No. 5,576,853. Holographic photo polymers are generally useful for recording photographic images by splitting coherent light into an illumination beam and a reference beam. The illumination beam irradiates the subject. The reflected beam from the subject and the reference beam, which bypasses the subject, irradiate the photo polymer medium, which contains a developable light sensitive photographic composition. The light waves of the two beams interfere, that is, by constructive and destructive interference they produce a standing wave pattern of sinusoidal peaks which locally expose the photographic composition, and nulls which do not locally expose the composition. When the photographic medium is developed, a corresponding interference pattern is recorded in the medium. By illuminating the medium with a coherent reference beam, the image of the subject is reproduced and can be viewed over a range of apparent angles.

The recorded interference pattern of a hologram representing a typical photographic subject is complex because light from all the illuminated points on the subject interfere with the reference beam at all points on the hologram. It would be possible by recording the image of a blank "subject" (effectively by interfering two reference beams), to make a blank hologram, also known as a sine grating, in which the interference pattern is more regular. In that case the interference pattern would resemble a diffraction grating but the pitch or resolution of the diffraction grating would be quite fine compared to the pitch of a projection screen having macro sized lenticular elements shaped to bend or refract light in a particular direction from rearward projection tubes.

A three dimensional holographic screen for a projection television was proposed by Polaroid Corporation, as one of many suggestions made during efforts to establish a market for the DMP-128® photo polymer holographic product. The proposal was based on advantages which Polaroid Corporation expected in terms of higher brightness and resolution, lower manufacturing cost, lower weight, and resistance to the abrasion to which two-piece screens are subjected during shipping. Polaroid Corporation never proposed any particular holographic configuration for the volume holographic elements which might make up such a holographic projection television screen, and never even considered the problem of color shift in projection television screens of any type, holographic or otherwise.

Overall, despite years of intensive development to provide a projection television receiver having a screen with a color shift less than 5, even significantly less than 5, or having a color shift as low as 5 for angles of $\alpha$ even greater than 10° or 11°, there have been no advances in solving the color shift problem other than incremental changes in the shapes and positions of lenticular elements and diffusers in conventional projection screens. Moreover, despite suggestions that three dimensional holograms might be useful for projection screens, although for reasons having nothing to do with color shift, there has been no effort to provide projection televisions with three dimensional holographic screens. A long felt need for a projection television receiver having significantly improved color shift performance, which can also be built into a significantly smaller cabinet, has remained unsatisfied.

SUMMARY

A projection television receiver in accordance with the inventive arrangements taught herein provides a direct projection system without the need for large mirrors and also provides a significant improvement in color shift performance, measured in orders of magnitude, that a color shift of 2 or less can be achieved with projection television receivers having angles of incidence a in the range of less than 10° or 11°. Moreover, the color shift performance is so significant that commercially acceptable projection television receivers having angles of incidence up to about 30° can be provided, in much smaller cabinets. The color shift performance of such large $\alpha$angle receivers is at least as good as conventional small $\alpha$angle receivers, for example having a color shift of 5, and can be expected to approach or even reach values as low as about 2, as in the small $\alpha$ angle receivers.

A projection television receiver in accordance with the inventive arrangements taught herein further provides improved visibility at large horizontal viewing angles. A holographic screen is provided having a gain which is approximately twice that of an ordinary lenticular and/or fresnel projection television screen. The holographic screen need not have a particularly wide horizontal half viewing angle (the displacement from normal of the viewing angle in a horizontal plane, at which the brightness is half the brightness when viewed on a line normal to the screen). As such the brightness when viewed off an axis orthogonal to the screen drops off substantially with divergence of the viewing angle from normal. In fact the holographic screen can have a horizontal half viewing angle which is approximately 70% of an conventional lenticular/fresnel projection television screen. However, it is an aspect of the invention that a high gain holographic screen in a projection television receiver yields an increase in overall brightness of the resulting television image, and the brightness is sufficient for viewing over a wide horizontal viewing angle notwithstanding. In fact the projection television receiver produces superior results over a range of −48° to +50° in horizontal viewing angle.

These results are achieved by forsaking the extruded lens screen technology altogether. Instead, a projection television receiver in accordance with an inventive arrangement has a screen formed by a three dimensional hologram formed on a substrate, for example, a polyethylene film, such as Mylar®.

Such a three dimensional holographic screen was originally developed for its expected advantages in terms of higher brightness and resolution, and lower manufacturing cost, lower weight and resistance to abrasion to which two-piece screens are subjected, for example during shipping. The discovery of the color shift performance of the three dimensional holographic screen came about when testing to determine if the optical properties of the three dimensional screen would be at least as good as a conventional screen. The color shift performance of the three dimensional holographic screen, as measured by equations (I) and (II), was unexpectedly low. The barriers which limited prior art improvements to incremental steps had been eliminated altogether. Smaller cabinets with projection geometry characterized by larger a angles of incidence can now be developed. The discovery of good visibility at large horizontal viewing angles of the three dimensional holographic screen came about when testing to determine if the optical properties of the three dimensional screen would be at least as good as a lenticular (e.g., fresnel) screen. The overall horizontal viewing brightness of the three dimensional holographic screen, particularly at large horizontal viewing angles, was quite unexpected. In general, prior art systems emphasize the need for projection television screens with extremely wide horizontal half viewing angles.

In addition to increased color shift performance and improved visibility, three dimensional holographic screens exhibit a greater increase in overall gain than is afforded by conventional extruded lens projection screens. The increased brightness afforded by the holographic screen allows for modification of the projectors in order to make the overall brightness of the screen more uniform. This is accomplished by occluding the center of the projector lenses thus decreasing the brightness of the center of the image projected onto the screen. Although conventional extruded lens projection screens could be modified in this way, a conventional screen does not exhibit a great enough overall brightness to afford for any loss of brightness along any point of the viewing field of the screen.

A projection television having the unexpected properties associated with three dimensional holographic screens, and in accordance with the inventive arrangements taught herein, comprises: at least three image projectors for respective images of different colors; a projection screen formed by a three dimensional hologram disposed on a substrate, the screen receiving images from the projectors on a first side and displaying the images on a second side with controlled light dispersion of all the displayed images; one of the projectors having a first optical path in a substantially orthogonal orientation with the screen and at least two of the projectors having respective optical paths converging toward the first optical path in a non orthogonal orientation defining angles of incidence; and, the three dimensional hologram representing a three dimensional array of lenticular elements having a configuration effective for reducing color shift in the displayed images, the screen having a color shift less than or equal to approximately 5 for all the angles of incidence in a range greater than 0° and less than or equal to approximately 30°, as determined by the maximum value obtained from at least one of the following expressions:

$$C(\Theta) = 20 \cdot \log_{10}\left(\frac{red(\Theta)}{blue(\Theta)}\right);$$

$$C(\Theta) = 20 \cdot \log_{10}\left(\frac{green(\Theta)}{blue(\Theta)}\right)$$

where θ is any angle within a range horizontal viewing angles, C(θ) is the color shift at angle θ, red(θ) is the red luminance level at angle θ, blue(θ) is the blue luminance level at angle θ and green(θ) is the green luminance level at angle θ. The color shift of the screen can be expected to be less than 5, for example, less than or equal to approximately 4, 3 or even 2. Each projector may have a partially occluded lens.

In terms of the known barrier at an angle of incidence of about 10° or 11°, the color shift of the screen is less than or equal to approximately 2 for all the angles of incidence in a first sub-range of angles of incidence greater than 0° and less than or equal to approximately 10°; and, the color shift of the screen is less than or equal to approximately 5 for all the angles of incidence in a second sub-range of angles of incidence greater than approximately 10° and less than or equal to approximately 30°.

The screen further comprises a light transmissive reinforcing member, for example, of an acrylic material in a layer having a thickness in the range of approximately 2–4 mm. The substrate comprises a highly durable, transparent, water-repellent film, such as a polyethylene terephthalate resin film. The substrate can be a film having a thickness in the range of about 1–10 mils. A thickness of about 7 mils has been found to provide adequate support for the three dimensional hologram. The thickness of the film is not related to performance. The three dimensional hologram has a thickness in the range of not more than approximately 20 microns. The projection television may further comprise one or more mirrors between the image projectors and the screen.

The projection screen is specifically arranged to improve brightness and uniformity over a wide range of angles of incidence of the projection beams. This is accomplished using a holographic screen as described, which exhibits substantially higher gain proceeding toward the edges. The gain of the holographic screen can be further enhanced by backing the screen with one or more linear fresnel panels having ridges that progressively vary in focal length from the center to the edges. The increase in gain of the screen allows the lenses of the projectors to be totally or partially occluded in the center. Although this dims the center of the image on the screen, the gain afforded by the holographic screen is such that the loss of brightness at the center of the screen is affordable and increases the center to edge ratio of brightness or provides a more uniform brightness across the screen.

According to further inventive arrangements taught herein, a projection television having the unexpected properties associated with three dimensional holographic screens comprises: at least three image projectors for respective images of different colors; a projection screen formed by a three dimensional hologram disposed on a substrate, the screen receiving images from the projectors on a first side and displaying the images on a second side with controlled light dispersion of all the displayed images; and, the three dimensional hologram representing a three dimensional array of lenticular elements having a configuration effective for relatively high gain.

The gain of the holographic screen represents the extent to which light that is incident on the rear of the screen at a range of angles of incidence, is redirected more nearly along a line parallel to the center optical axis normal to the screen. In a projection television having three projection tubes that are necessarily spaced from one another, the holographic screen effectively provides diffuseness and redirection of light in the required direction, substantially more effectively than lenticular screens or other diffractive and refractive structures.

DESCRIPTION OF THE PREFERRED EMBODIMENTS

Figure 1:
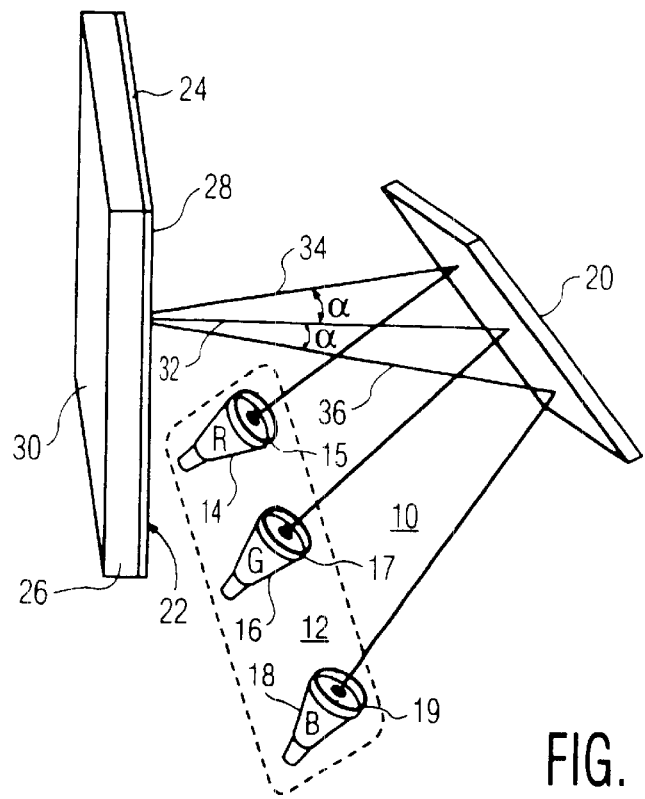
FIG. 1 is a diagrammatic representation of a projection television in accordance with the inventive arrangements taught herein.

A projection television receiver 10 is illustrated in FIG. 1. An array 12 of projection cathode ray tubes 14, 16 and 18 provide red, green and blue images respectively. The cathode ray tubes are provided with respective lenses 15, 17 and 19. The projected images are reflected by a mirror 20 onto a projection screen 22. Additional mirrors can also be utilized, depending on the particular geometry of the optical paths. The green cathode ray tube 16 projects the green image along an optical path 32, which in this example is oriented substantially orthogonal to screen 22. In other words, the centerline of the optical path is at right angles to the screen. The red and blue cathode ray tubes have respective optical paths 34 and 36, which converge toward the first optical path 32 in a non orthogonal orientation defining angles of incidence α. The angles of incidence introduce the problem of color shift. Additionally, a portion of the light emanating from lens 15, 17, 19 normally is scattered directly onto screen 22. This condition detracts from the contrast ratio of the screen 22 and diminishes the image quality.

The screen 22 comprises a three dimensional hologram 26 disposed on a substrate 24. Hologram 26 is a print of a master hologram substantially forming a diffraction pattern that manages the distribution of light energy from the three projectors 14, 16, 18, and can be made variable across the width and/or height of the screen. In a preferred arrangement, the hologram is a "center only" hologram that tends to reorient incident light. The screen receives images from the projectors on a first, entrance surface side 28 and displays the images on a second, exit surface side 30, with controlled light dispersion of all the displayed images. The substrate is preferably a highly durable, transparent, water-repellent film, such as a polyethylene terephthalate resin film. One such film is available from E. I. du Pont de Nemours & Co. under the trademark Mylar®. The film substrate has a thickness in the range of about 1–10 mils, equivalent to about 0.001–0.01 inches or about 25.4–254 microns. A film having a thickness of about 7 mils has been found to provide adequate support for the three dimensional hologram disposed thereon. The thickness of the film does not affect screen performance in general or color shift performance in particular, and films of different thickness may be utilized. The three dimensional hologram 26 has a thickness of not more than approximately 20 microns.

Three dimensional holographic screens are available from at least two sources. Polaroid Corporation utilizes a proprietary, wet chemical process to form three dimensional holograms in its DMP-128 photo polymer material. The process includes forming a diffractive holographic pattern in the photo polymer material, which pattern can include variations in screen gain across the range of horizontal and/or vertical viewing angles. A master hologram can be prepared by exposing photo polymer holographic media to coherent light including a reference beam and a beam reflected from a planar pattern having light-to-dark variations corresponding to the desired variation in gain.

A preferred embodiment of the three dimensional holographic screens used in the projection television receivers described and claimed herein were manufactured by the Polaroid Corporation wet chemical process, in accordance with the following performance specifications:

Horizontal half viewing angle: 38°±3°,
Vertical half viewing angle: 10°±1°,
Screen gain: ≧8,
Color shift: ≦3, where the horizontal and vertical viewing angles are measured conventionally, screen gain is the quotient of light intensity directed from the source toward the rear of the viewing surface, and light intensity from the front of the viewing surface toward the viewer, measured orthogonal to the screen, and color shift is measured as described above. The extraordinary color shift performance of the three dimensional holographic projection screen was, as explained in the Summary, wholly unexpected.

Figure 2:
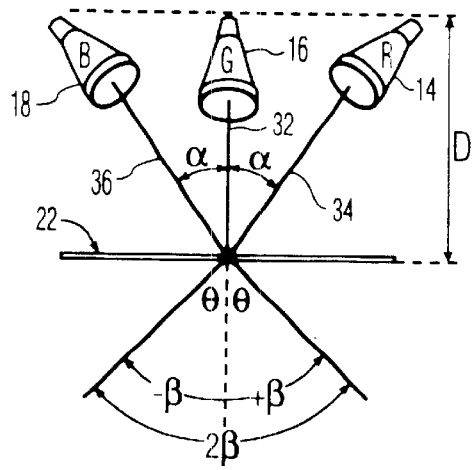
FIG. 2 is a simplified diagram of projection television geometry useful for explaining the inventive arrangements.

FIG. 2 is a simplified projection television diagram, omitting the mirror and lenses, for explaining color shift performance. The optical axes 34 and 36 of the red and blue cathode ray tubes 14 and 18 are aligned symmetrically at angles of incidence a with respect to the optical axis 32 of the green cathode ray tube 16. The minimum depth D of a cabinet is determined by the distance between the screen 22 and the rear edges of the cathode ray tubes. It will be appreciated that if the angle a is to become smaller, the cathode tubes must be placed closer together and/or must be spaced further from the screen to provide clearance for the tubes. At a sufficiently small angle α, such interference cannot be avoided. This undesirably increases the minimum depth D of a cabinet. Conversely, as the angle α gets larger, the cathode ray tubes can be moved closer to the screen 22, reducing the minimum depth D of a cabinet.

On the viewing side of the screen 22, two horizontal half viewing angles are designated −β and +β. Together, a total horizontal viewing angle of 2β is defined. The half viewing angles may typically range from ±40° to ±60°. Within each half angle are a plurality of specific angles θ, at which color shift can be measured and determined, in accordance with equations (I) and (II) explained above.

In terms of the known barrier at an angle of incidence of about 10° or 11°, the color shift of the three dimensional holographic screen is less than or equal to approximately 2 for all the angles of incidence in a first subrange of angles of incidence greater than 0° and less than or equal to approximately 10°; and, the color shift of the screen is less than or equal to approximately 5 for all the angles of incidence in a second subrange of angles of incidence greater than approximately 10° and less than or equal to approximately 30°. It is expected that a color shift of less than or equal to approximately 2, as in the first subrange, can also be achieved in the second subrange of larger angles of incidence.

Figure 3:
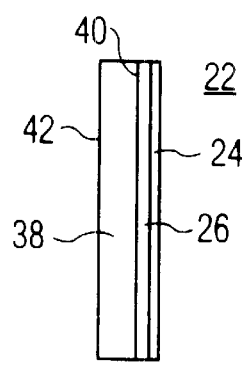
FIG. 3 is a side elevation of a reinforced projection screen according to the inventive arrangements.

With reference to FIG. 3, the substrate 24 comprises a transparent film, such as Mylar®, as described above. The photo polymer material from which the three dimensional hologram 26 is formed is supported on the film layer 24. A suitable photo polymer material is DMP-128®.

The screen 22 may further comprise a light transmissive reinforcing member 38, for example, of an acrylic material, such as polymethylmethacrylate (PMMA). Polycarbonate materials can also be used. The reinforcing member 38 is presently a layer having a thickness in the range of approximately 2–4 mm. The screen 22 and the reinforcing member are adhered to one another throughout the mutual boundary 40 of the holographic layer 26 and the reinforcing member 38. Adhesive, radiation and/or thermal bonding techniques may be utilized. The surface 42 of the reinforcing layer may also be treated, for example by one or more of the following: tinting, anti-glare coatings and anti-scratch coatings.

Figure 4:
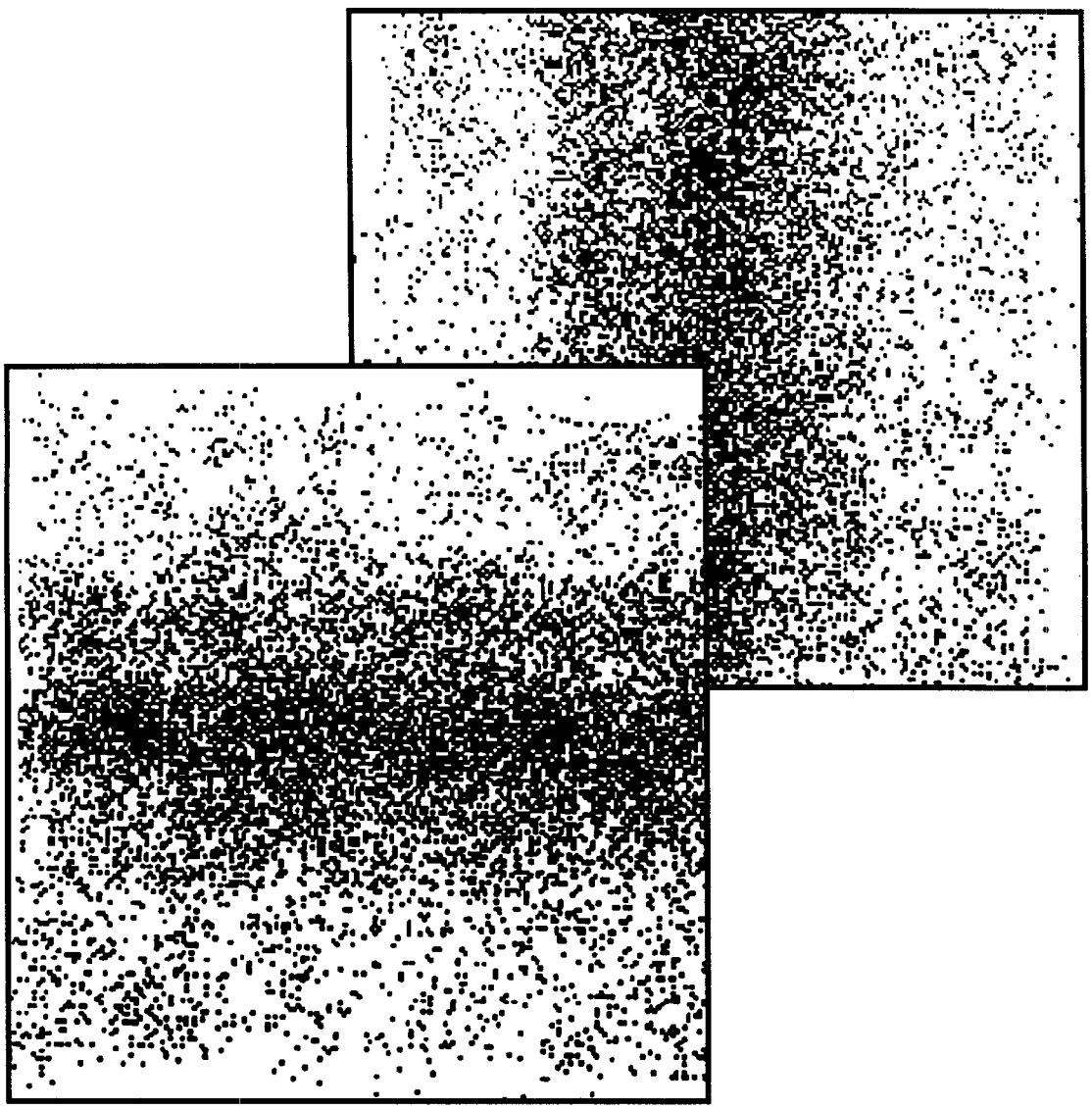
FIG. 4 is a schematic representation of an alternative embodiment of a projection screen with two superimposed holograms containing gain variations across horizontal and vertical viewing angles, respectively.

Various surfaces of the screen and/or its constituent layers may be provided with other optical lenses or lenticular arrays to control aspects of the projection screen bearing on performance characteristics other than color shift performance, as is known to do with conventional projection screens, without impairing the improved color shift performance of the three dimensional holographic projection screen. FIG. 4 illustrates a first such variation wherein at least two holograms are superimposed or stacked. According to the example shown, a first hologram having a horizontal gain variation across a viewing field of ±40° is stacked with a second hologram having a vertical gain variation across a field of ±20°. The gain variations are suggested by shading in the drawing, but when not illuminated the actual holographic elements simply appear to be diffuse across their surfaces. The result of superimposing horizontal and vertical gain variation holograms is substantially equivalent to a center-only hologram; however, the brightness level is varied at different rates across the horizontal span and the vertical span, because the horizontal span is substantially larger than the vertical span.

Figure 5:
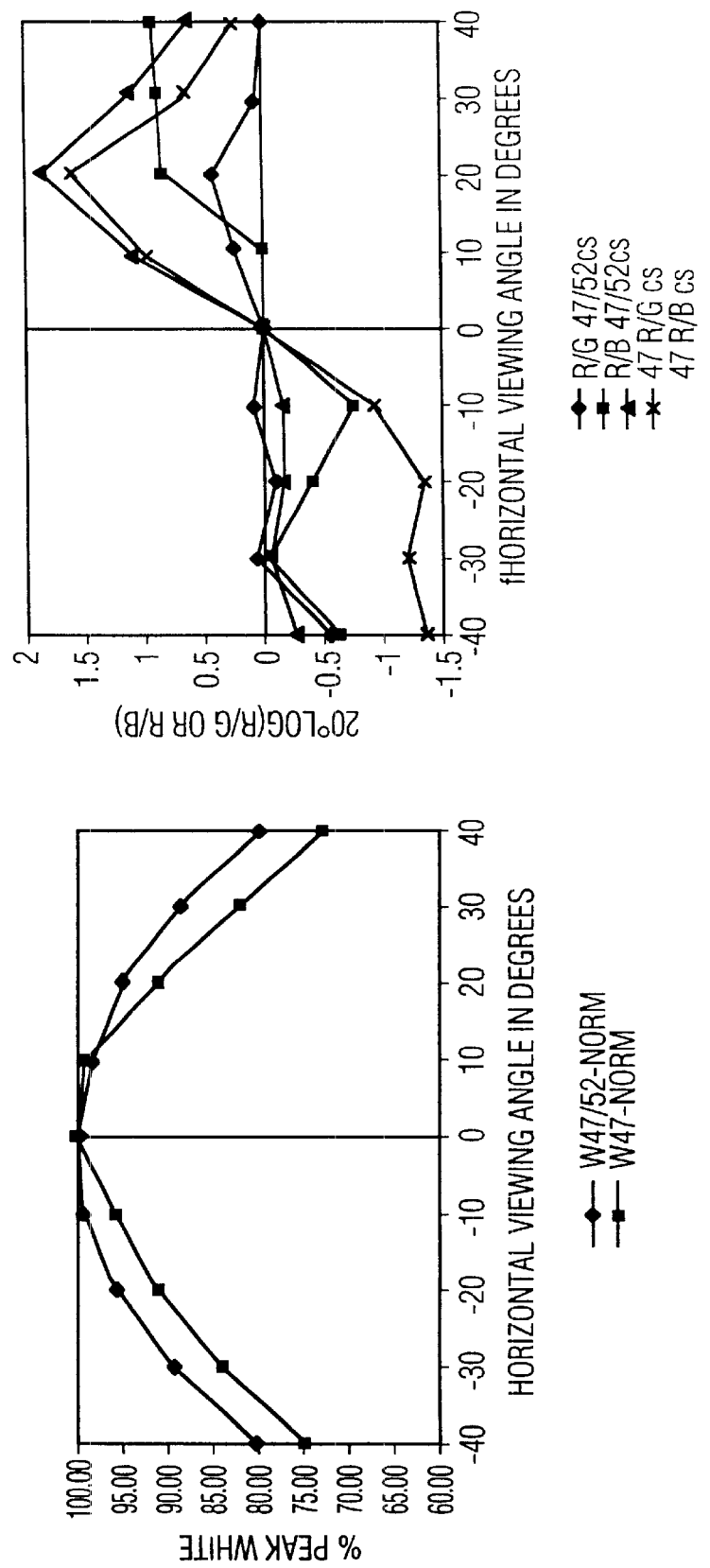
FIG. 5 is a graphic representation of the proportion of peak white brightness as a function of horizontal viewing angle, using a horizontally varied holographic element with and without the stacked vertically varying holographic element.

FIG. 5 is a graph of measured screen brightness as a percentage of peak white brightness through a horizontal viewing span of ±40°, at a point in the center of the screen. The two lines on the graph represent the brightness using only a horizontally varying hologram and brightness using stacked horizontally and vertically varying holograms. The horizontal brightness variation with stacked holograms is substantially equal or slightly improved over the performance of the horizontal hologram alone.

In designing a holographic screen for a variety of performance domains, it can be difficult to make a screen that implements all desired performance characteristics at once. Stacking allows the separate handling of different demands, such as vertical and horizontal variations in gain, the requirements for which may be different, for example due to the aspect ratio of the screen (i.e., wider than tall), or a need for an offset on one axis (e.g., vertical) while remaining centered on the other. This arrangement is not limited to two stacked holograms having linear or other gain variations, but is also applicable to additional stacked holograms, for example to control chromatic aberration or other aspects of light transmission through the screen, or to stacking with elements that improve edge brightness, color shift performance and the like.

Figure 6:
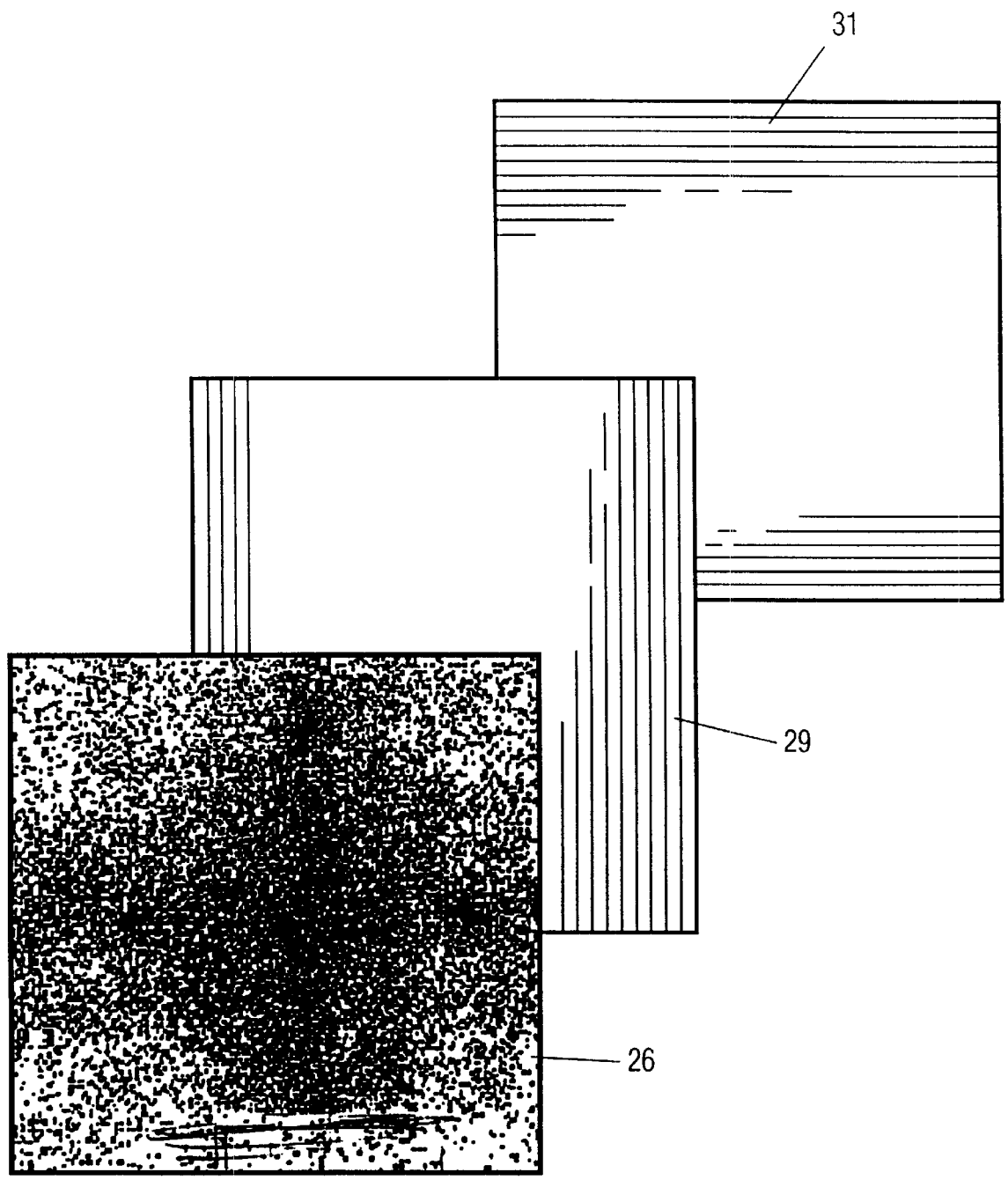
FIG. 6 is a schematic drawing of an alternative embodiment having stacked holographic and collimating screen layers.

FIG. 6 illustrates a further variation in which a center-only hologram 26 (i.e., having horizontal and vertical gain variation) is stacked with linear fresnels 29, 31 for effecting horizontal and vertical collimation. In this embodiment, a horizontally active (vertically lenticular) fresnel 29 and a vertically active (horizontally lenticular) fresnel 31 are provided. Stacking allows the separate handling of vertical and horizontal collimation, and linear fresnels can be less expensive than circular ones. For example, this embodiment has favorable cost implications because linear fresnels can be embossed or roller extruded inexpensively as compared with a circular fresnel. A circular fresnel can account for as much as 60% of the cost of a conventional screen. A linear fresnel costs about 25% of the cost of a circular one. Therefore, a 30% cost savings is possible (i.e., (25%+25%)*60%=30%). As with the horizontal and rotated holograms as discussed above, the linear fresnels can be varied across the horizontal and/or vertical viewing span as necessary, for example to vary the focal lengths independently in the vertical and horizontal spans. The two stacked linear fresnels can be placed in either order behind the holographic element.

Figure 7:
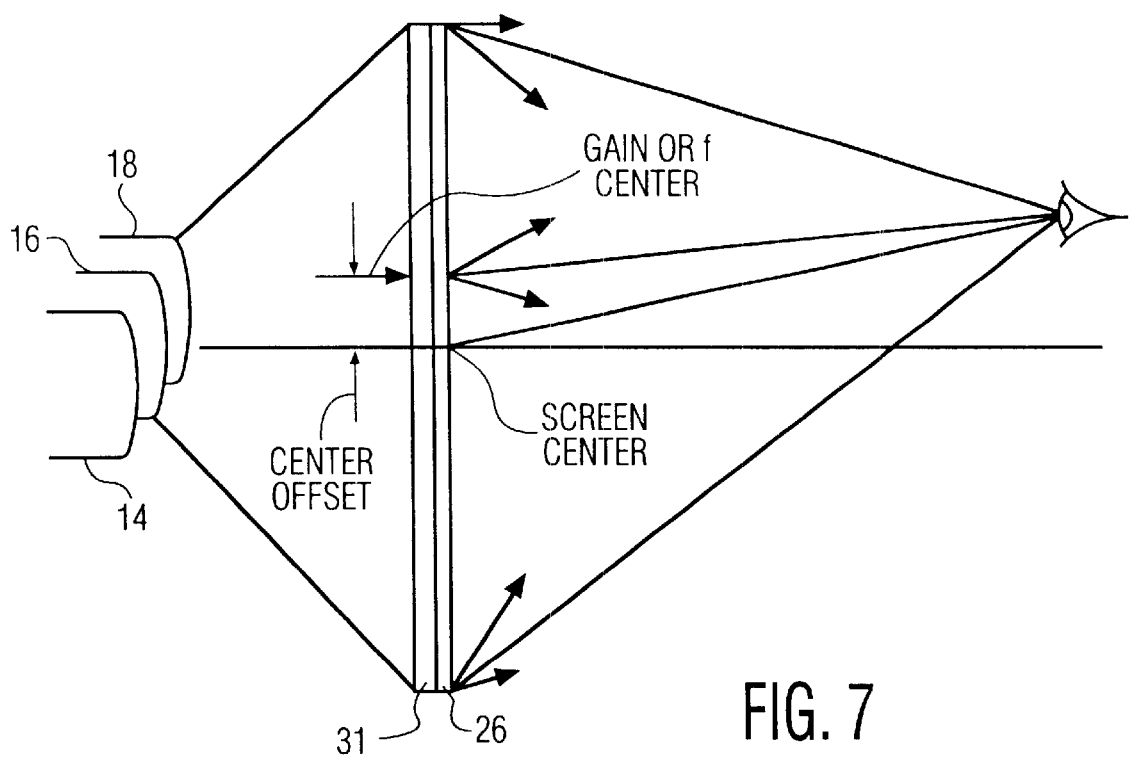
FIG. 7 is a schematic representation of the effects of variations in holographic gain and fresnel focal length across a length or width of the screen, together with offsetting of the centers of gain and/or focal length variation.

Moreover, one or more linear fresnels provide an additional degree of freedom as illustrated in FIG. 7. It is desirable that the brightness of the display be as uniform as possible from all angles and at all points on the screen. A circular fresnel (not shown) thus can be centered on the screen and provided with a focal length equal to the distance between the exit pupil of the projection tubes and the screen. The fresnel orients light from the projection tubes perpendicular to the screen surface regardless of the angle at which the light arrives. This is shown in an approximate way by the thin lens equation:

$$\frac{1}{s} + \frac{1}{s'} = \frac{1}{f}$$

where s is the distance from the exit pupil to the screen; s' is the distance from the screen to the apparent "image"; and f is the focal length of the fresnel. If s=f, then s' goes to infinity, and an image apparently at infinity implies that the light rays leaving the screen are parallel.

It is known to provide a continuous variation in focal length from the center of the screen to the edges as a means to improve the brightness of the screen edges compared to the center, effectively by directing light at the edges of the screen more inwardly toward the center axis of the screen. In the thin lens equation, for example, if one posits a variable δ representing the incremental difference in focal length between two points on a fresnel (e.g., from the center toward the edge) and substitutes f+δ for f, the following solution shows the effect on f, the distance to the apparent image:

$$\frac{1}{f+\delta} = \frac{1}{s'} + \frac{1}{f}$$

$$s' = \frac{-(-f^2 + f \cdot \delta)}{\delta}$$

Figure 8:
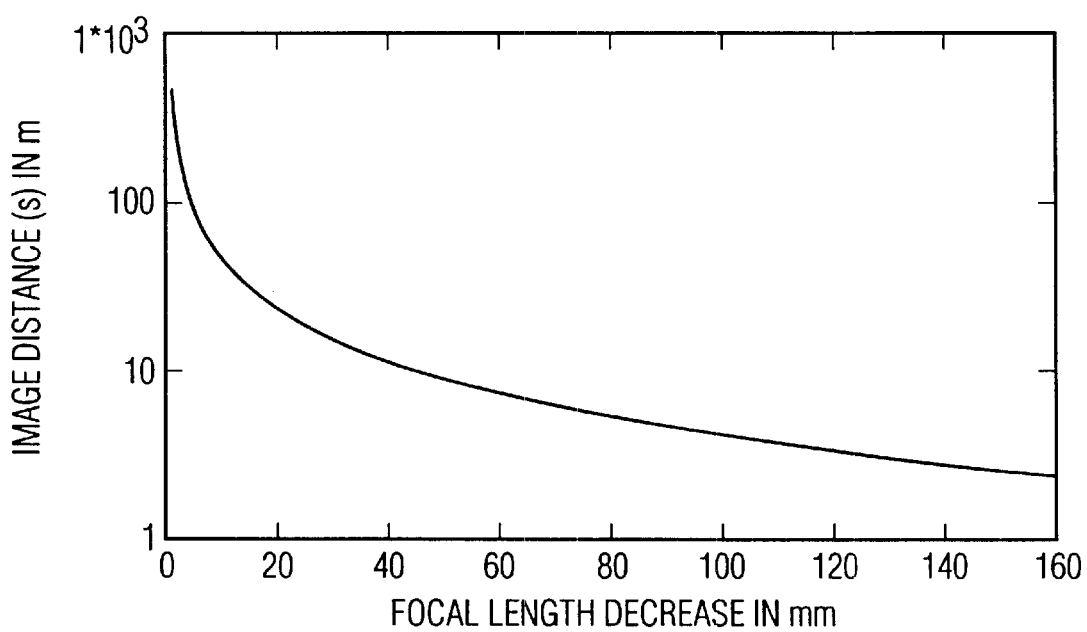
FIG. 8 is a graphical representation of the effect of variations in the focal length of the linear fresnel lens on the apparent image.

This function is illustrated in FIG. 8, and shows that the apparent image comes closer as the focal length decreases.

In the case of a circular fresnel, the amount of correction can be optimized in all directions outwardly from the center of the screen. However, the aspect ratio of a screen is generally wider in the horizontal direction (4:3 or 16:9), such that larger correction is needed to optimize for the horizontal screen edges. With a linear fresnel element and a horizontal fresnel element, all of the power of the vertical and horizontal elements can be used to move the light inwardly toward the axis in the respective vertical or horizontal plane. The focal length variation in the vertical and horizontal directions from the screen to the edges can be made at different rates. The result is improved minor axis and corner illumination as compared to a circular fresnel.

Referring to FIG. 7, a further degree of freedom with linear fresnels is that the vertical and horizontal directions can be independently centered. Generally it is advantageous that the screen appearance be&symmetrical across the range of horizontal viewing angles. As to vertical, however, it may be desirable to have somewhat of an up-angle or down-angle, for example in a floor or ceiling mounted projection screen respectively. In order to accommodate the vertical viewing offset, a linear vertical fresnel can be offset in the required direction, while the horizontal fresnel remains centered. A drawback is that the brightness of the screen is higher near the top of the screen than near the bottom.

A conventional fresnel is symmetrical about its center (whether or not the center is offset on the screen). According to a further inventive aspect, the vertical fresnel can vary in focal length at different rates proceeding upwardly from the center than downwardly. A modestly different focal length at the top and the bottom of the screen balances the difference in brightness caused by vertically offsetting the center point of the fresnel, providing more uniform brightness.

According to a further inventive aspect, differences in center to edge brightness are balanced by corresponding variations in gain in holographic screen element 26. The following measurements were made to compare the center and edge brightness of two holographic screens having respective nonvarying gain of 14.8 and 22.5, with a holographic screen that had a gain of 14.8 at the center and 22.5 at the edges. The points are identified using clock face numbering to distinguish the edge points as to the major and minor axis, and the brightness measurements W are in footcandles.

EXAMPLE 1

Nonvarying Holographic Gain 14.8

| Point | W    | % of Ctr | Means      |
|-------|------|----------|------------|
| ctr   | 1159 | 100.00   | Major Axis |
| 3     | 22.1 | 27.70    | 25.19      |
| 9     | 26.3 | 22.69    | Minor Axis |
| 6     | 38.1 | 32.87    | 39.52      |
| 12    | 53.5 | 46.16    | Corner     |
| 2     | 11.7 | 10.09    | 7.74       |
| 4     | 8.3  | 7.16     |            |
| 8     | 64   | 5.52     |            |
| 12    | 9.5  | 8.20     |            |

EXAMPLE 2

Nonvarying Holographic Gain 22.5

| Point | W     | % of Ctr | Means      |
|-------|-------|----------|------------|
| ctr   | 172.7 | 100.00   | Major Axis |
| 3     | 55.8  | 32.31    | 28.84      |
| 9     | 43.8  | 25.36    | Minor Axis |
| 6     | 633   | 36.65    | 41.40      |
| 12    | 79.9  | 46.15    | Corner     |
| 2     | 18.6  | 10.77    | 8.31       |
| 4     | 13.3  | 7.70     |            |
| 8     | 10.8  | 6.25     |            |
| 12    | 14.7  | 8.51     |            |

EXAMPLE 3

Varying Holographic Gain 14.8 at Center and 22.5 at Edge

| Point | W    | % of Ctr | Means      |
|-------|------|----------|------------|
| ctr   | 1159 | 100.00   | Major Axis |
| 3     | 55.8 | 48.14    | 42.97      |

-continued

| Point | W    | % of Ctr | Means      |
|-------|------|----------|------------|
| 9     | 43.8 | 37.79    | Minor Axis |
| 6     | 633  | 54.62    | 61.69      |
| 12    | 79.7 | 68.77    | Corner     |
| 2     | 18.6 | 16.05    | 12.38      |
| 4     | 133  | 11.48    |            |
| 8     | 10.8 | 9.32     |            |
| 12    | 14.7 | 12.68    |            |

From the foregoing examples it can be seen that as a matter of proportions considering the average brightness at opposite edges, varying the gain of the holographic screen in this matter produces a brightness improvement on the edges of the major axis (3 and 9 o'clock of 72%, measured as the improvement in edge brightness as a portion of center brightness, minor axis edge improvement (6 and 12 o'clock) of 55%, and extreme corner improvement of 50%.

The forgoing center to edge variations are useful individually and in combinations, and can be embodied, for example, as multiple layer screens.

In another inventive aspect of the projection system, the screen 22 comprises a three dimensional hologram 26 disposed on a substrate 24. The screen receives images from the projectors on a first, entrance surface side 28 and displays the images on a second, exit surface side 30, with controlled light dispersion of all the displayed images. Advantageously, screen 22 comprises different optical symmetry properties than the conventional screens disclosed hereinabove. More particularly, the optical symmetry is nearly perfect, i.e., optical properties of screen 22 are identical, regardless of the screen's physical orientation (e.g., horizontal or vertical). Holographic screens of the type contemplated for use with the present invention typically exhibit highly elliptical optical properties, i.e., higher transmissive properties along one axis (e.g., major) and lower transmissive properties along another axis (e.g., minor). In the case of a conventional screen, i.e., those prior art screens comprising lenticular lenses and the like, the relevant optical properties are multi-stepped, and therefore, not symmetric. In the present invention, holographic screen 22 is very elliptical, outputting light in a narrow vertical envelope. In other words, it win only accept light that is incident on its surface at a very narrow range of vertical angles. As a result, stray scattered or reflected light, that is incident on screen 22 outside of a few degrees of the vertical nominal, is not transmitted by screen 22, thus improving the overall image contrast.

Figure 9:
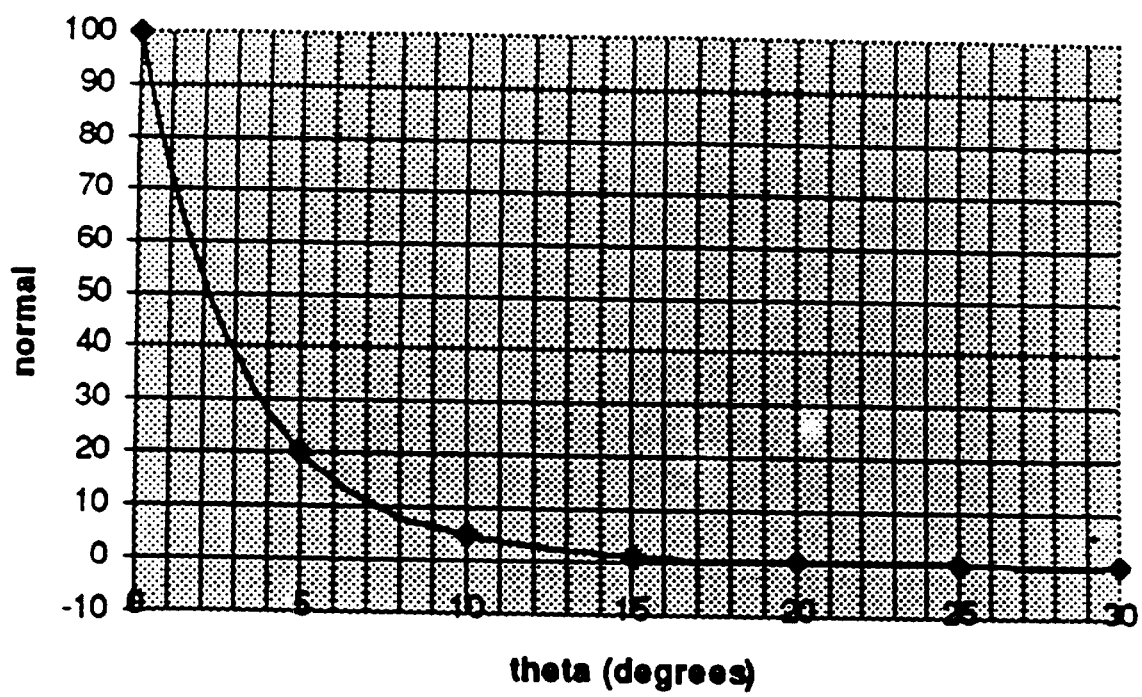
FIG. 9 is a graphical representation of the vertical light exclusion properties of the present invention.
Figure 10:
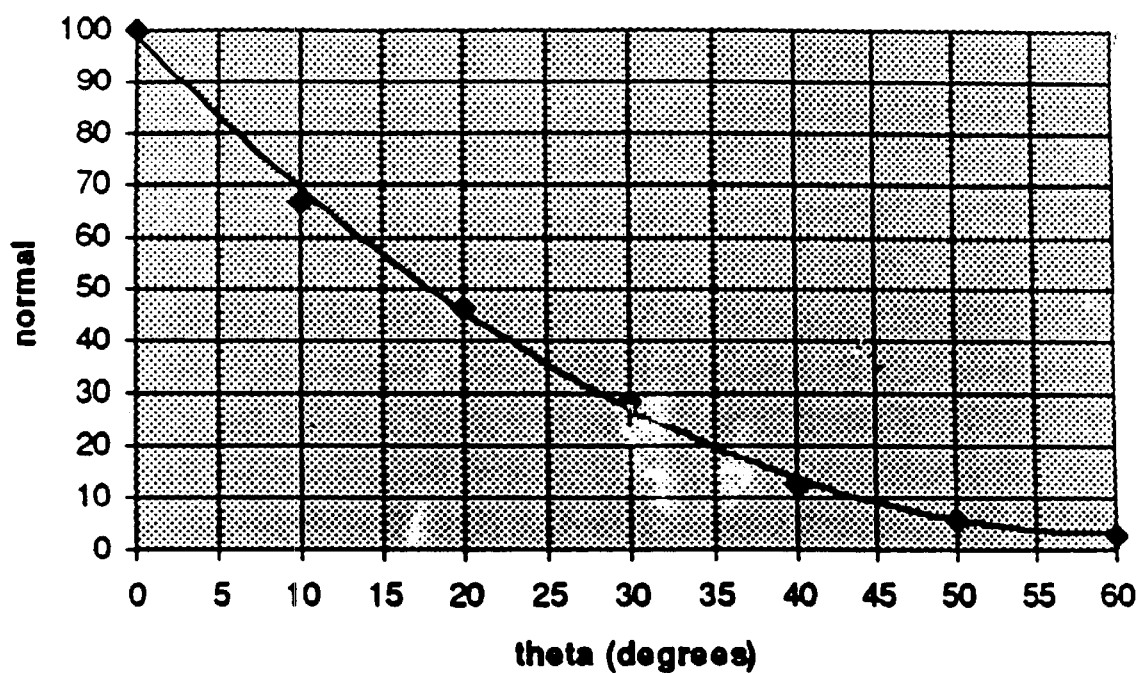
FIG. 10 is a graphical representation of the horizontal light exclusion properties of the present invention.
Figure 11:
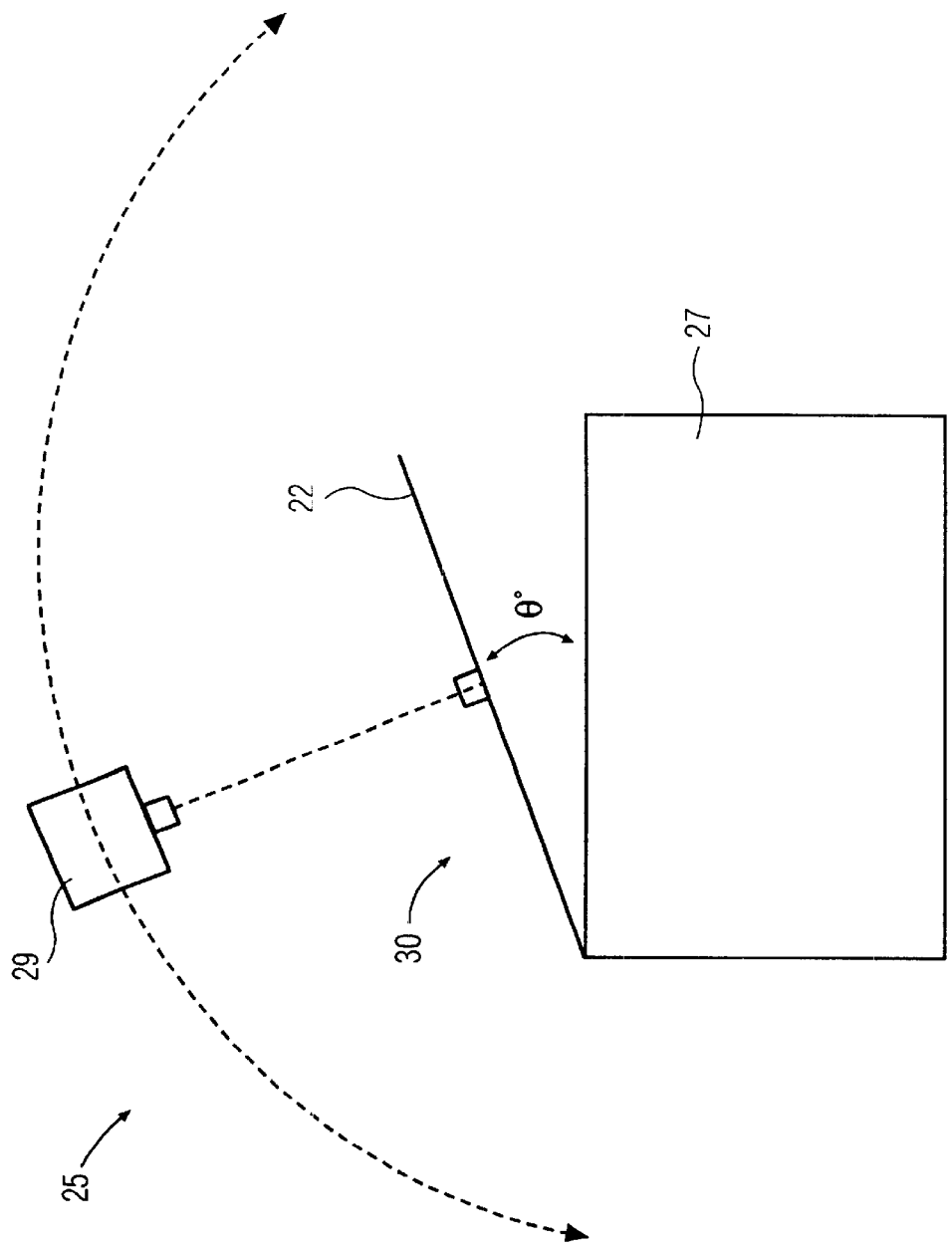
FIG. 11 is a schematic representation of the testing fixture used to obtain the data displayed in FIGS. 9 and 10.

The vertical and horizontal exclusion properties of the invention are graphically shown in FIGS. 9 and 10. The data used to create the graphs of FIGS. 9 and 10 were collected using the test setup 25 shown in FIG. 11. A 46 inch projection television (46" PTV) 27, having only a green CRT, was used to collect data regarding the optical transmission through screen 22 as a function of the vertical and horizontal angle of incidence, measured in degrees by light sensor 29, and designated by the Greek letter θ. The screen assembly 30 is adapted to be rotated about one of its vertical sides FIG. 11). Thus, the screen receives green light from different angles θ as the screen assembly is rotated. Light sensor 29 is kept normal to screen 22 so that, at screen center, the percent transmission of the light incident at the measured incidence angle may be recorded. Advantageously, measurements were made with the holographic diffusion screen in the vertical (90 degree rotated)

position so as to simulate the diminution of light directly from PTV lens 15, 17, 19.

The following table presents data obtained from the foregoing test set-up and also forms the basis of the graphs shown in FIGS. 9 and 10.

| Theta | Green |
|---|---|
| HORIZONTAL SCREEN ORIENTATION | |
| 10° | 111.5 |
| 20° | 77.5 |
| 30° | 47.7 |
| 40° | 20.9 |
| 50° | 9.9 |
| 60° | 5.1 |
| VERTICAL SCREEN ORIENTATION | |
| 5° | 33. |
| 10° | 8.0 |
| 15° | 2.0 |
| 20° | .9 |
| 25° | .47 |
| 30° | .32 |
| 0° | 167.0 |

Thus stray reflected or scattered light, from lens 15, 17, 19, that is incident on the interior of screen 22, but is outside of a few degrees of the vertical nominal angle, is not transmitted by the screen. FIGS. 9 and 10 show the level of exclusion of input light in the vertical and horizontal directions. The vertical holographic effect excludes input light at any but the intended input angles, e.g., 50% at about 2.5 degrees, 90% at about 7 degrees, and essentially zero beyond 20 degrees. The horizontal holographic effect excludes the input 50% at about 18 degrees and 90% at about 45 degrees.

Very often a direct image of the lens is visible from the exit surface side 30 of the screen in a conventional PTV. In the present invention, when holographic screen 22 is oriented in a 90 degree rotated position, i.e., with the horizontal axis oriented up and down, the direct image of the lens is also visible through the holographic screen. However, when screen 22 is placed in its normal orientation, the direct image of lens 15, 17, 19 is missing from exit surface side 30 of the screen. Thus the hologram is blocking the unwanted stray or scattered light that is incident on the screen from steep vertical angles. In prior art devices, light baffles have been necessary to remove such direct lens images from the image.

Another aspect of the inventive arrangements taught herein is the ability to design rear projection televisions having a significantly reduced cabinet depth. Particularly, the rear projection televisions of the invention may incorporate a plurality of image projectors wherein none of the image projectors has an axis of projection coincident with the orthogonal axis of the screen. Rather, the aspects of the invention may provide for a rear projection television wherein each image projector therein has an axis of projection that defines an angle of projection, $\phi$, relative to the orthogonal axis of the screen. The televisions of the invention are capable of correcting for angles of projection, $\phi$, of up to 30° such that the images displayed on the screen will be directed at an angle of display relative to the orthogonal axis of the screen, wherein the angle of display ranges from 0 to 5°.

Figure 12:
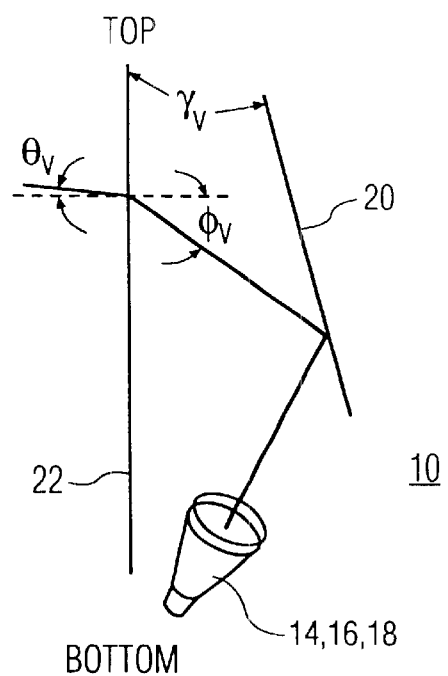
FIG. 12 is another simplified diagram of projection television geometry useful for explaining the inventive arrangements.

For example, the television designs of the invention are capable of accommodating angles of projection comprising an extreme up angle, thereby facilitating a significant reduction in the required cabinet depth. FIG. 12 depicts a mirror 20 oriented at an angle $\gamma_v$ in a vertical plane with screen 22 such that the images projected onto mirror 20 by projection cathode ray tubes 14, 16 and 18 are reflected onto projection screen 22 at an angle of projection comprising an extreme up angle, $\phi_v$, in the vertical plane. Screen 22 redirects the images reflected thereon such that the images transmitted through screen 22 are directed at an angle of display, $\theta_v$, in the vertical plane of from 0 to 5°, preferably between 3 and 5°, wherein the images are reflected on screen 22 with an angle of projection comprising an extreme up angle, $\phi_v$, of from 10 to 30°, preferably from 15 to 30°, most preferably at least 15°.

Figure 13:
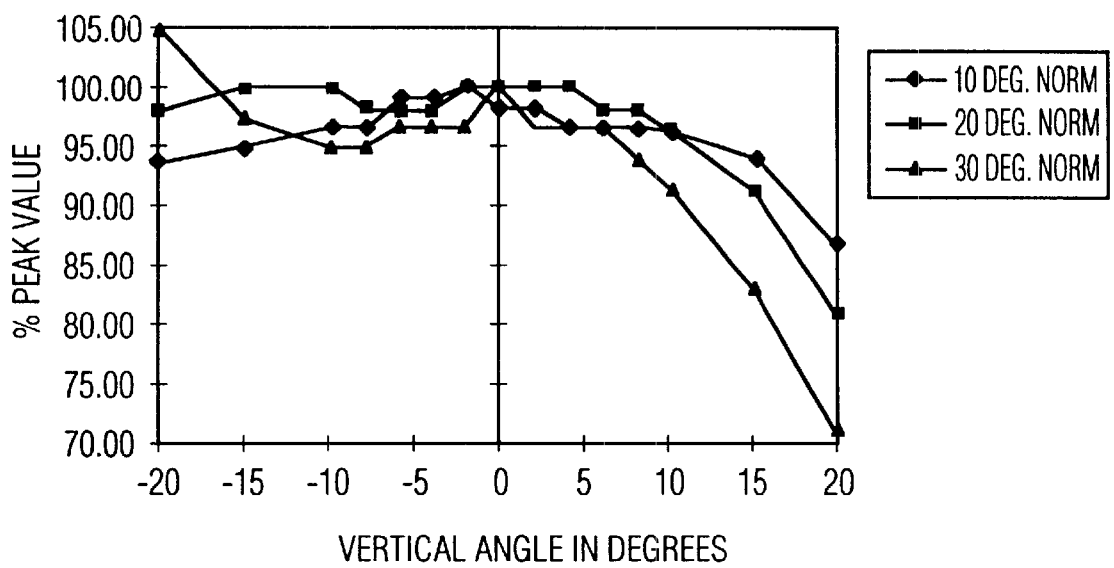
FIG. 13 is a graph of measured brightness as a percentage of peak white brightness through a vertical viewing span of ±20°, at a point in the center of the screen, for an angle of projection, $\phi_v$, in the vertical plane of 10°, 20° and 30°.

This aspect of the invention was tested for three different angles of projection, $\phi_v$, namely 10°, 20° and 30°. Specifically, light was reflected onto the back of screen 22 at a given angle of projection, $\phi_v$, while measurements were taken of the intensity of the light transmitted through screen 22 at different vertical viewing angles. The results of these tests are displayed in graphical form in FIG. 13. Particularly, FIG. 13 is a graph of the measured brightness as a percentage of peak white brightness through a vertical viewing span of ±20°, at a point in the center of the screen.

Figure 14:
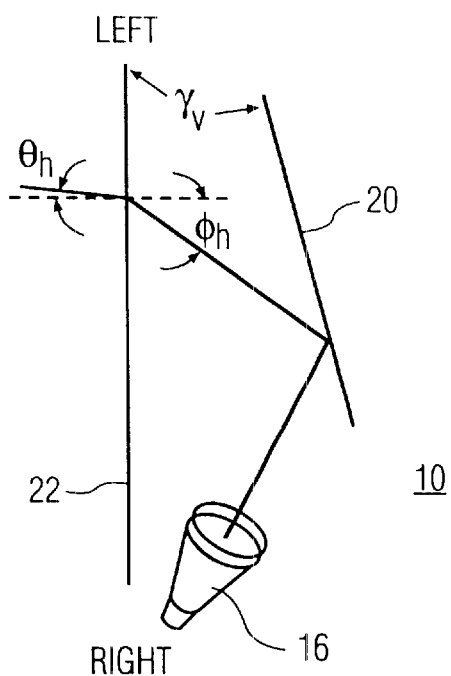
FIG. 14 is another simplified diagram of projection television geometry useful for explaining the inventive arrangements.

Another aspect of the inventive arrangements taught herein is the ability to use a mirror 20 which facilitates angles of projection comprising extreme side approach angles. FIG. 14, depicts mirror 20 oriented at an angle $\gamma_h$ in a horizontal plane with screen 22 such that the image projected onto mirror 20 by projection cathode ray tube 16 is reflected onto projection screen 22 at an angle of projection comprising an extreme side approach angle, $\phi_h$, in the horizontal plane. Screen 22 redirects the images reflected thereon such that the image transmitted through screen 22 is directed at an angle of display, $\phi_h$, of from 0 to 5°, preferably between 3 and 5°, wherein the image is reflected on screen 22 at an angle of projection comprising an extreme side approach angle, $\phi_h$, of from 10 to 30, preferably from 15 to 30°, most preferably of at least as large as 15°.

Figure 15:
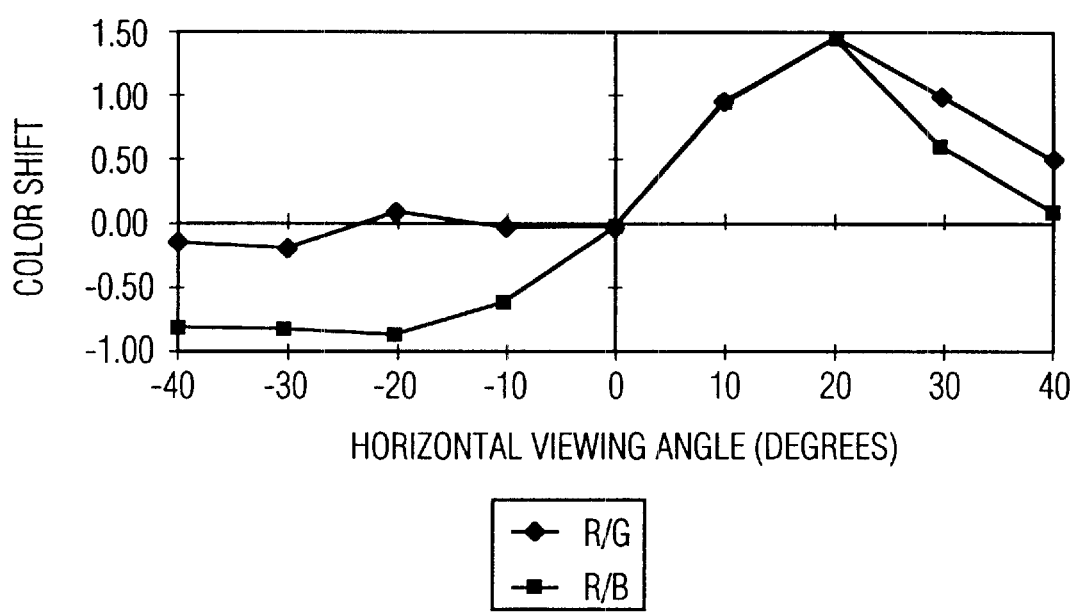
FIG. 15 is a graph of the red/green and red/blue color shift observed through a horizontal viewing span of ±40°, for an angle of projection, $\phi_h$, in the horizontal plane of 0°.
Figure 16:
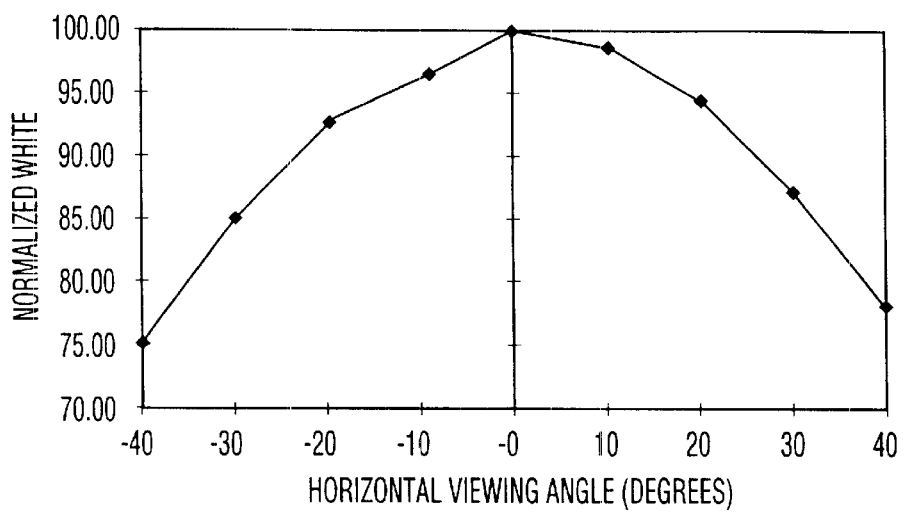
FIG. 16 is a graph of measured screen brightness as a percentage of peak white brightness through a horizontal viewing span of ±40°, at a point in the center of the screen, for an angle of projection, $\phi_h$, in the horizontal plane of 0°.
Figure 17:
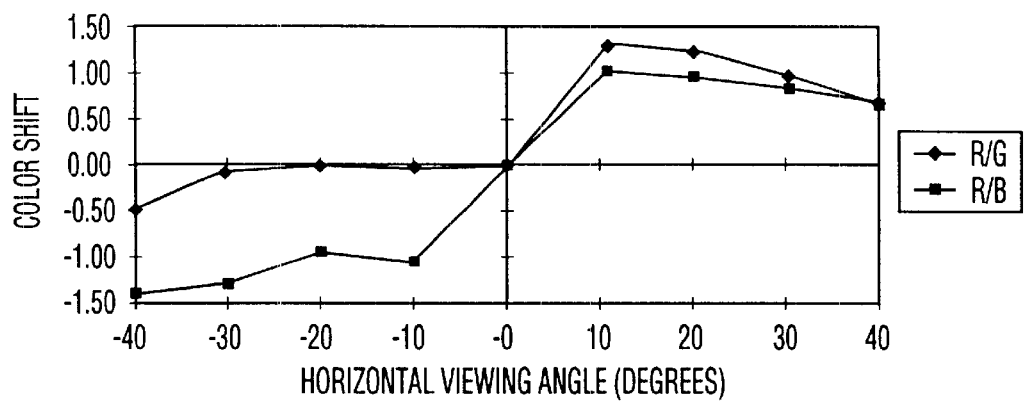
FIG. 17 is a graph of the red/green and red/blue color shift observed through a horizontal viewing span of ±40°, for an angle of projection, $\phi_h$, in the horizontal plane of 15°.
Figure 18:
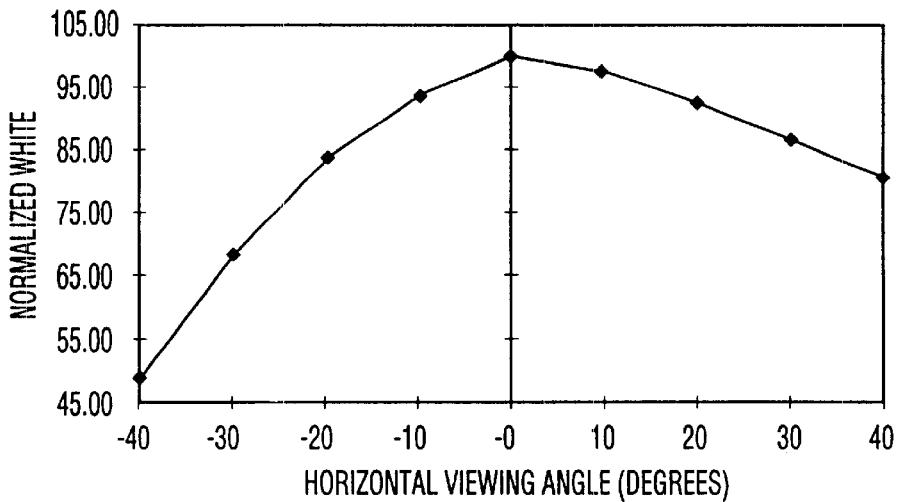
FIG. 18 is a graph of measured screen brightness as a percentage of peak white brightness through a horizontal viewing span of ±40°, at a point in the center of the screen, for an angle of projection, $\phi_h$, in the horizontal plane of 15°.
Figure 19:
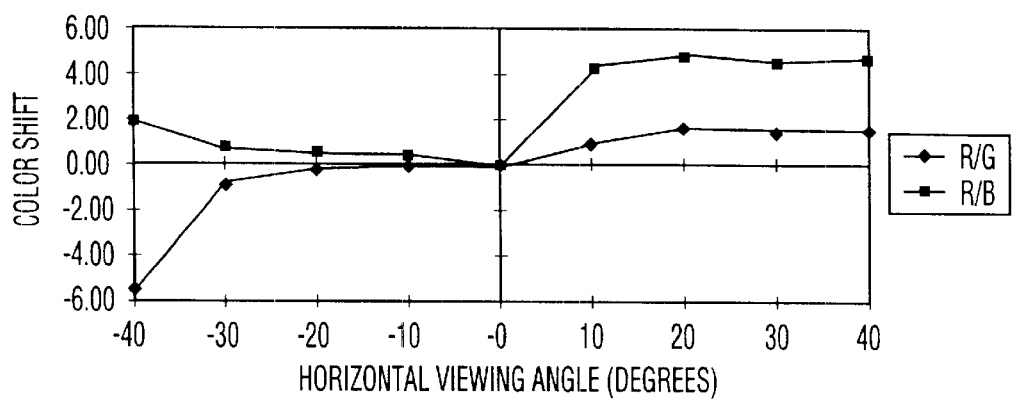
FIG. 19 is a graph of the red/green and red/blue color shift observed through a horizontal viewing span of ±40°, for an angle of projection, $\phi_h$, in the horizontal plane of 30°.
Figure 20:
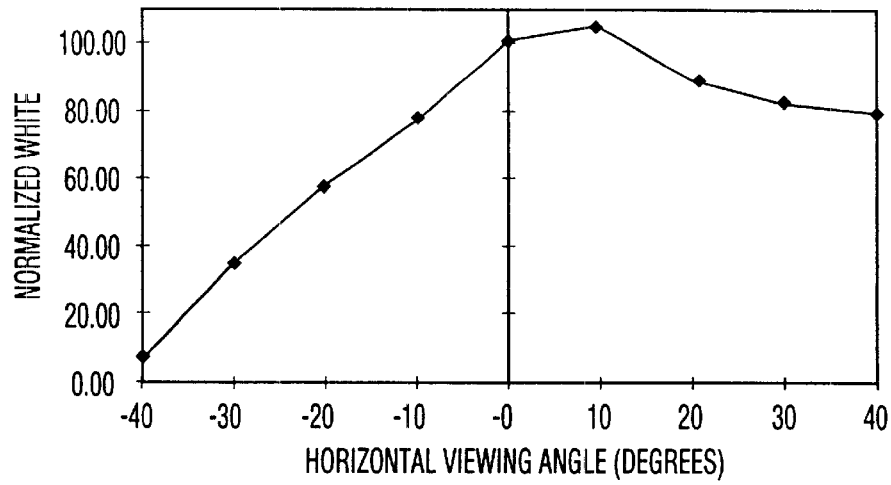
FIG. 20 is a graph of measured screen brightness as a percentage of peak white brightness through a horizontal viewing span of ±40°, at a point in the center of the screen, for an angle of projection, oh, in the horizontal plane of 30°.
Figure 21:
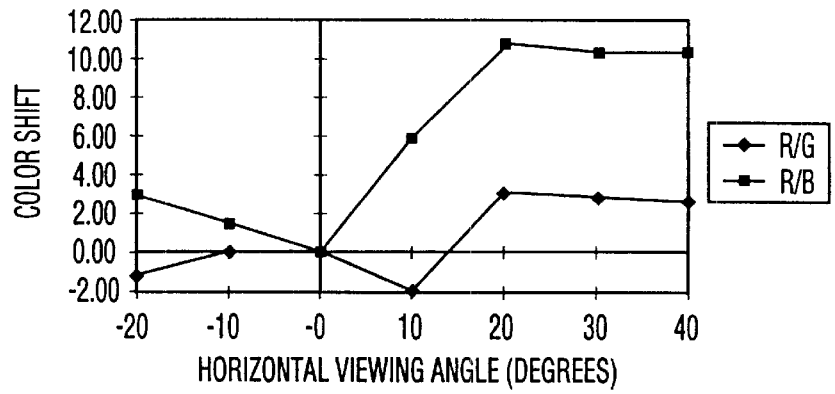
FIG. 21 is a graph of the red/green and red/blue color shift observed through a horizontal viewing span of ±40°, for an angle of projection, $\phi_h$, in the horizontal plane of 45°.
Figure 22:
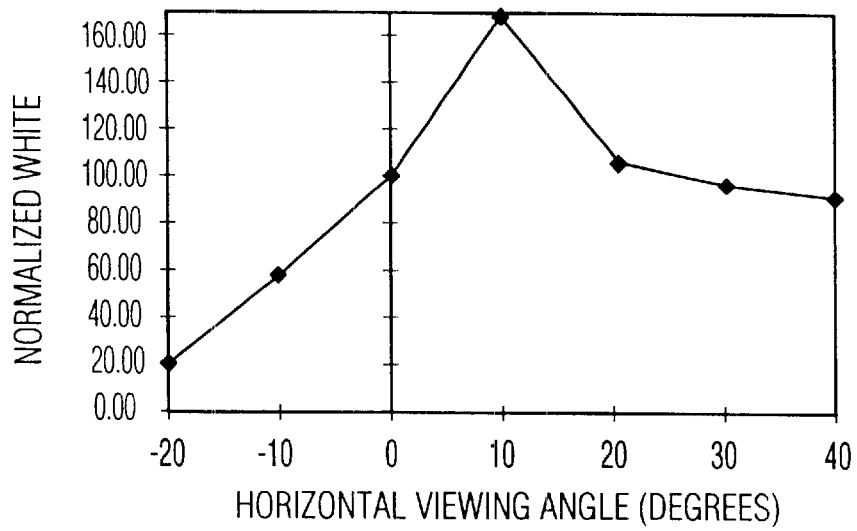
FIG. 22 is a graph of measured screen brightness as a percentage of peak white brightness through a horizontal viewing span of ±40°, at a point in the center of the screen, for an angle of projection, $\phi_h$, in the horizontal plane of 45°.

This aspect of the invention was tested for four extreme side approach angles, $\phi_h$, namely 0°, 15°, 30° and 45°. Specifically, light was reflected onto the back of screen 22 at a given angle of projection, $\phi_h$, while measurements were taken of the intensity of the light transmitted through screen 22 and of the red/green and red/blue color shift as a function of the horizontal viewing angle. The results of these tests are displayed in graphical form in FIGS. 15 through 22. Specifically, FIGS. 15 and 16 are a graph of the red/green and red/blue color shift observed through a horizontal viewing span of ±40° and a graph of measured screen brightness as a percentage of peak white brightness through a horizontal viewing span of ±40°, at a point in the center of the screen; respectively, for angle $\phi_h$ of 0°. FIGS. 17 and 18 are a graph of the red/green and red/blue color shift observed through a horizontal viewing span of ±40° and a graph of measured screen brightness as a percentage of peak white brightness through a horizontal viewing span of ±40°, at a point in the center of the screen; respectively, for angle $\phi_h$ of 15°. FIGS. 19 and 20 are a graph of the red/green and red/blue color shift observed through a horizontal viewing span of ±40° and a graph of measured screen brightness as a percentage of peak white brightness through a horizontal viewing span of ±40°, at a point in the center of the screen; respectively, for angle $\phi$ of 30°. FIGS. 21 and 22 are a graph of the red/green and red/blue color shift observed through a horizontal viewing span of ±40° and a graph of measured screen brightness as a percentage of peak white brightness through a horizontal viewing span of ±40°, at a point in the center of the screen; respectively, for angle $\phi_h$ of 45°.

Figure 23:
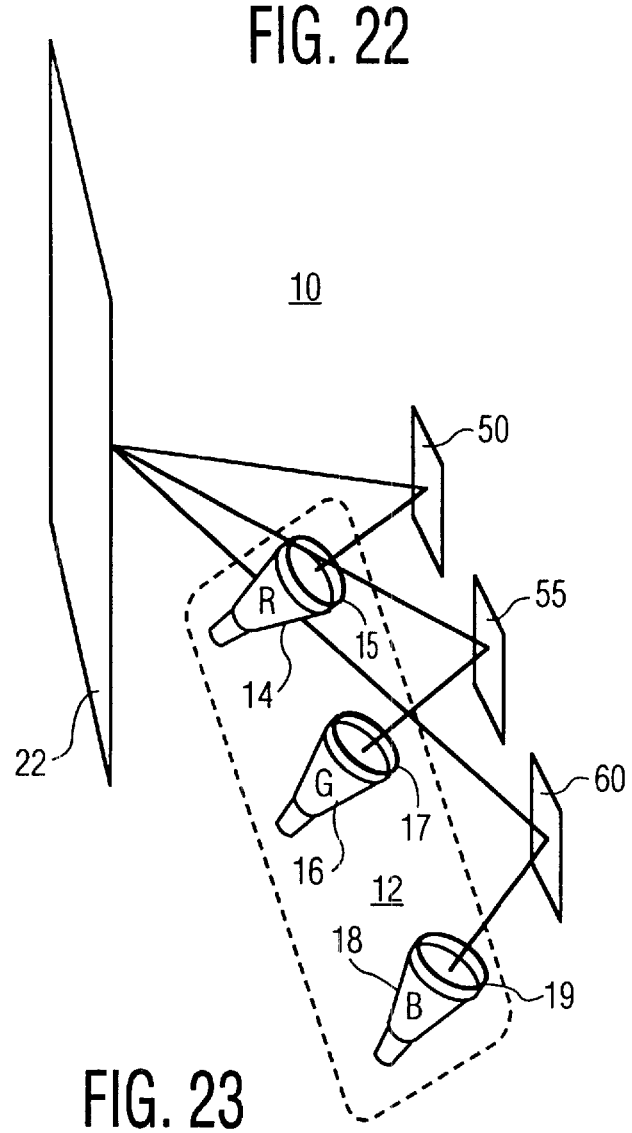
FIG. 23 is another simplified diagram of projection television geometry useful for explaining the inventive arrangements.

In another variation of the inventive arrangement, each individual projection cathode ray tube cooperates with a separate at least one mirror, wherein the separate mirrors are oriented so the respective images reflected thereby collectively converge on the same spot on the back of the screen. FIG. 23, depicts a preferred example of this variation of the invention, wherein mirror 20 is replaced by mirrors 50, 55 and 60. Mirrors 50, 55 and 60 are individually oriented such that they reflect light along optical axes that converge at the center of screen 22, the images being projected by projection cathode ray tubes 14, 16 and. 18, respectively. The concepts of the invention, and in particular the holographic screen, permit mirrors 50, 55 and 60 whose optical axes need not be extremely close to orthogonal to screen 22. Rather, using the concepts of the invention, the images reflected onto screen 22 by mirrors 50, 55 and 60 may be incident thereto with an angle of projection, ϕ, of 0 to 30°, preferably 15 to 30°, most preferably about 15°.

A holographic screen element exhibits substantially improved gain as compared to a lenticular screen, whether a single hologram, stacked holograms or a combination hologram and conventional stacked linear fresnel sheet are utilized. However, like a lenticular screen the holographic screen is responsive to the illumination afforded by the projection tubes and associated optics. The illumination incident on the holographic screen from the optics is brightest along the projection axis of each tube. This is one aspect of the problem of color balance.

Another aspect of the color balance problem is due to the fact that although a particular screen may be very efficient in gathering the incident light and dispersing the light in the intended direction (e.g., a holographic screen may be 99.9% efficient), the screen tends to be nearly transparent to the remaining fraction of light. The screen fails to gather this light due to the effects of Raleigh Scattering, the same effect which colors the day sky blue and the sunset sky red. In the case of projection from a large, diffuse source of light, such as a CRT, the effect on the image is fairly low level and can be addressed by improved holographic efficiency, or the addition of weak diffusion material. In the case of projection from small, focused light sources, such as in LCD or DMD projection, the problem is more severe. The blue and green components are spread out by the holograph and generally do not produce a very apparent bright spot. Light from the red source, however, is not spread out well by the holograph and produces an apparent bright red spot on the screen. The lost or scattered portion of the light produces a bright area in the image corresponding to the position of the light source in the rear. Occluding an area at and adjacent to the center of the projection lens of the red light source eliminates this problem.

Figure 24:
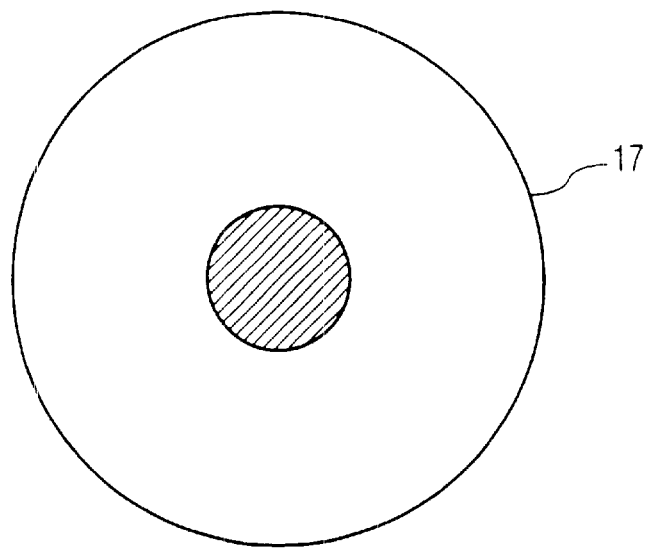
FIG. 24 is a front elevation of an occluded lens of one of the projectors.

According to an inventive aspect, the excellent gain of a holographic screen permits the problem to be corrected by modifying the projector lenses 15, 17 and 19 to reduce illumination along the centerline of each projection axis. This is accomplished by partially or totally occluding an area at the center of each lens. As shown in FIG. 24, the center of lens 17 is occluded by placing an opaque object directly in the center of lens 17. Since the occlusion is not placed at a location where light from the projector is coming to focus, the occlusion is not visible on the screen, and the entire image from the projection CRT is focused using the remaining unoccluded portion of the lens. However, some light (i.e., the rays that are along the axis) is blocked, thus reducing the brightness of the spot that would otherwise occur due to scattering and/or inefficiencies of the projection screen.

Figure 25:
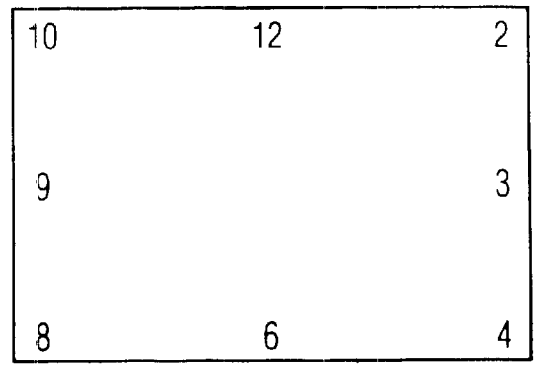
FIG. 25 is a schematic drawing of the screen and a table which gives the brightness of the numerically labeled points on the screen as compared to the brightness at the center of the screen.

FIG. 25 is a table which gives the intensity of the light at numerically labeled points on the screen as a percentage of the intensity of the light at the center of the screen. The second column from the left lists the percentage brightness without the occlusion, while the third column from the left lists the percentage brightness with the occlusion. These measurements were taken using a circular occlusion about 0.25" in diameter on the lens, which is about 3.0" in diameter. For example, the 3 o'clock position on the screen is only 28% as bright as the center of the screen without the lens being occluded, but is 34% as bright as the center with the lens occluded. In general, occlusion of the lens will lead to an improvement in brightness uniformity of 22% along the major axis (the 3 and 9 o'clock positions); 27% along the minor axis (the 6 and 12 o'clock positions); and 27% in the corners (the 2,4,8, and 10 o'clock positions).

This inventive aspect preferably is applied to a holographic screen. Occluding the lens of a conventional lenticular screen would have the effect of reducing centerline brightness. However, conventional screens do not have the gain of a holographic screen and reducing centerline brightness in this manner would unduly darken the image.

According to a further inventive aspect, the optical correction applied to the images between the projection tubes an d the screen is distributed between the glass lenses 15, 17 and 19 and the mirror 20, which can be curved to provide optical correction.

According to a further aspect, mirror 20 can comprise a panchromatic holographic reflector that exhibits the optical properties of a concave mirror and functions in a manner similar to a spherical or parabolic lens system. Holographic optical elements that simulate the characteristics of conventional optical elements are known. For example, holographic optical elements have been produced that behave simultaneously as both a positive and negative lens, i.e., sinusoidal zone plates and the like. Such holographic optical elements are disclosed at chapter 7 of "An Introduction to Lasers and Their Applications," Addison-Wesley Publishing Company, ISBN 0-201-05509-0, Library of Congress Card No. 76-46184, which is hereby incorporated.

When using a mirror 20 formed by a panchromatic holographic reflector, optical paths 32, 34 and 36 first converge o n the surface of mirror 20 as a result of passing through conventional lenses 15, 17 and 19. Mirror 20 further focuses the images onto screen 22 by causing optical paths 32, 34 and 36 to strongly converge at the screen. In this way, mirror 20 increases convergence of the images on screen 22. This arrangement also has the advantage of allowing for a greatly foreshortened light path-length in the projection system of the present invention, and thereby provides for the use of a much smaller optical system and a compact television receiver cabinet.

Figure 26:
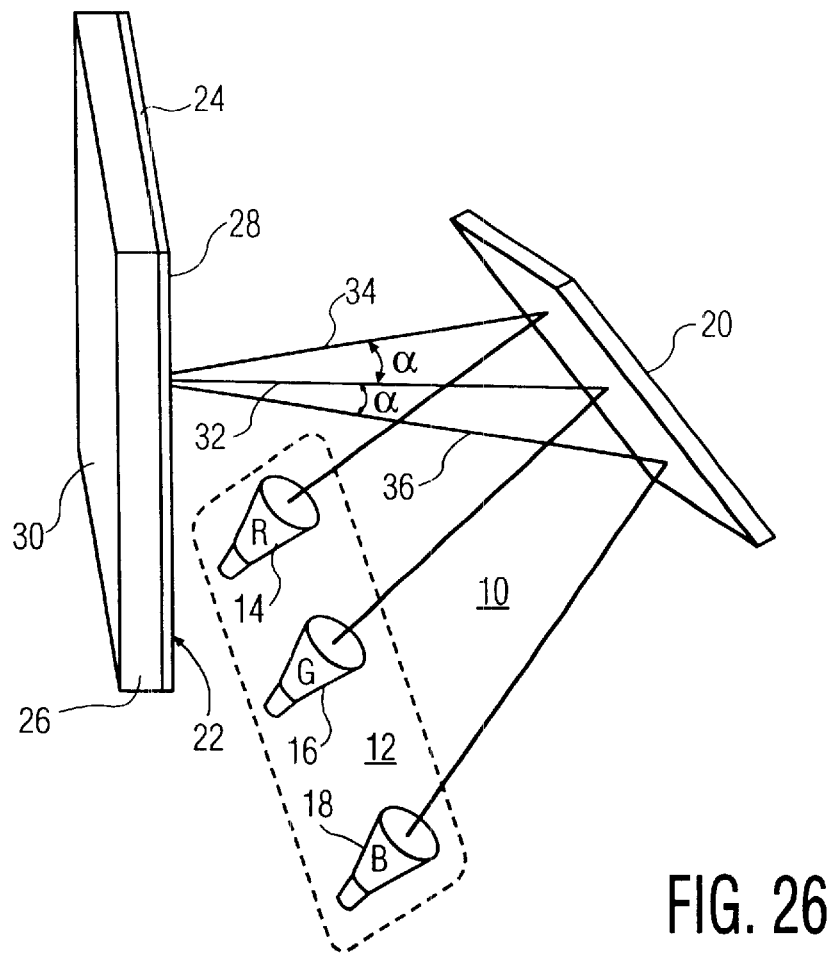
FIG. 26 is a diagrammatic representation of a projection television similar to that shown in FIG. 1, but with the lenses removed from the projectors according to a further embodiment of the invention.

Whereas part of the optical power is contributed by the holographic mirror, fewer demands are placed on lenses 15, 17 and 19, which can comprise relatively inexpensive polymer lenses. According to a further inventive aspect, lenses 15, 17 and 19 can be eliminated completely and their function met entirely by the holographic reflector (mirror 20). In that case, the image projectors have exit pupils that do not magnify or focus the images at all. With this arrangement, the images projected from cathode ray tubes 14, 16 and 18 follow either parallel or slightly diverging optical paths and are reflected and converged at screen 22 by holographic mirror 20 (see FIG. 26).

According to a further inventive aspect, the optical system can be adapted so as to correct for chromatic aberrations, especially to counteract chromatic aberrations introduced further along the optical path by screen 22. Holographic optical elements such as screen 22 exhibit a strong wavelength dependency due to the diffractive nature of the hologram, which substantially comprises a photographically recorded interference pattern. As a consequence, holographic optical elements tend to be highly dispersive, and behave differently at different wavelengths. The use of a holographic diffusion screen comprising vertical optical power, such as is contemplated with screen 22, creates chromatic aberrations in the transmitted images. These aberrations are often most pronounced along the vertical axis of screen 22. Holographic mirror 20 may also comprise a hologram in which the chromatic properties (wavelength dependent characteristics) along its vertical axis have been preselected so as to chromatically precondition the images from each of cathode ray tubes 14, 15 and 18 and thereby compensate for the corresponding chromatic aberrations induced by the wavelength dependent dispersive screen 22. In this way, the images are prealigned so as to enter screen 22 at appropriately preselected angles so that, as they exit screen 22, they are diffracted by an amount necessary to cause all the images to be substantially parallel to each other, thereby forming a panchromatic image.

It is well known that holograms and holographic optical elements, such as screen 22, comprise a strong wavelength dependency due to the diffractive nature of holograms. As a consequence, holograms and holographic optical elements tend to be highly dispersive, i.e, they behave differently at different wavelengths. The structure, properties and applications of holograms and holographic optical elements are disclosed at chapter 7 of "AN INTRODUCTION TO LASERS AND THEIR APPLICATION", published by the Addison-Wesley Publishing Company, ISBN 0-201-05509-0, Library of Congress Card No. 76-46184, which text is hereby incorporated herein by reference.

The use of a holographic diffusion screen comprising vertical optical power, such as is contemplated with screen 22, typically results in chromatic aberrations in the transmitted images. When these aberrations occur, they are often most pronounced along the vertical axis of screen 22. In three dimensional holographic screens of the type used in connection with the present invention, the effective index of refraction of screen 22 is significantly wavelength dependent, which contributes to the bending of some colors more strongly toward the horizontal axis of the screen than other colors. This results in some form of "color banding" along the vertical axis of the screen.

Figure 27:
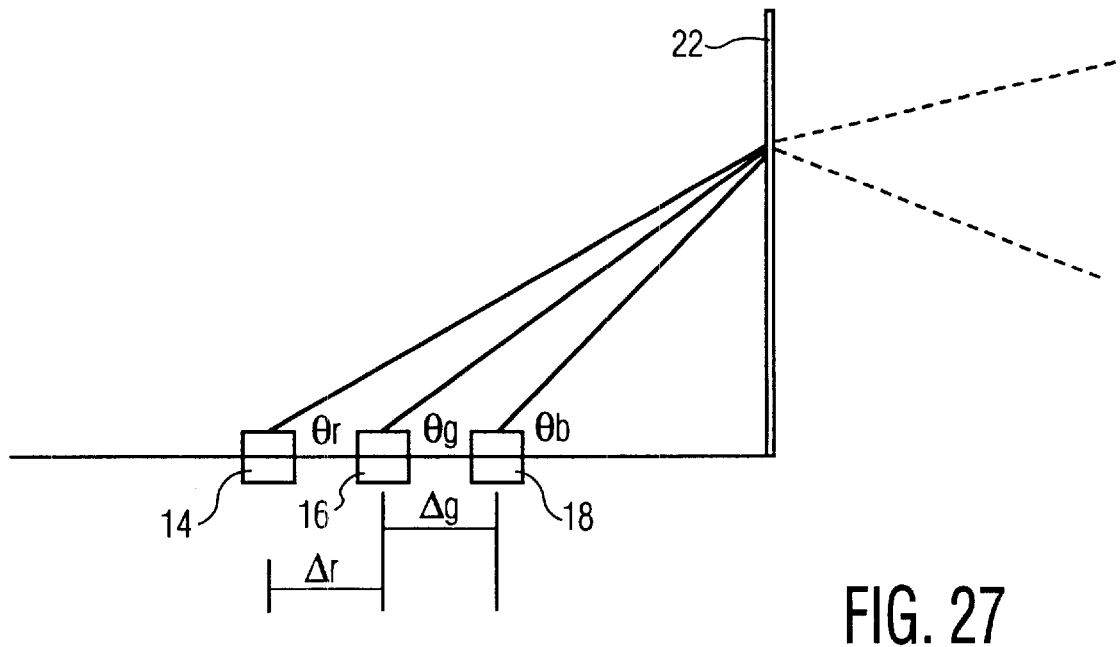
FIG. 27 is a diagrammatic representation of an alternative embodiment of the optical system used in connection with the projection television of the present invention.

In one preferred embodiment of the invention, the optical system is adapted so as to correct for chromatic aberrations in screen 22. Referring now to FIG. 27, projection cathode ray tube assemblies 14, 16 and 18, comprising lenses 15, 17 and 19 respectively, are positioned in stepped-relation to one another so as to selectively vary the input angles, $\theta_r$, $\theta_g$, $\theta_b$, and thereby compensate for the output angles induced by the passage of the images through screen 22 and that contribute to the observed chromatic aberrations. The amount of each step, i.e., the graduated distance between each projection cathode ray tube assembly 14, 16 and 18, may be approximated by assuming an average index of refraction of holographic screen 22 for each of the red, green and blue images according to the following expression:

$$\frac{1}{n_r} \cdot \sin(\theta_r) = \frac{1}{n_g} \cdot \sin(\theta_g) = \frac{1}{n_b} \cdot \sin(\theta_b)$$

For example, a typical set of average refractive index values, as a function of wavelength, for three dimensional holographic screen 22, are:

$n_r$=1.73

$n_g$=1.50

$n_b$=1.324

$\theta_g$=24.215°

Note that $\theta_g$ is equal to 24.215° corresponding to a green light path length of 900 mm. Thus, the light path difference, i.e. the stepping distances Δb, and Δr necessary to compensate for the corresponding chromatic aberrations on screen 22, for a 46 inch projection television formed in accordance with the invention, having a 900 mm green light path length would be:

Δb=123.19·mm=4.85"

Δr=−103.89·mm=−4.09"

The foregoing values of Δb and Δr yield appropriate input angles of $\theta_b$ and $\theta_r$ for the blue and red light images respectively. Thus by selectively adjusting the red and blue CRT positions, and thereby the input angles $\theta_r$, and $\theta_b$, the chromatic aberrations (color banding) are significantly abated, or removed entirely.

Figure 28:
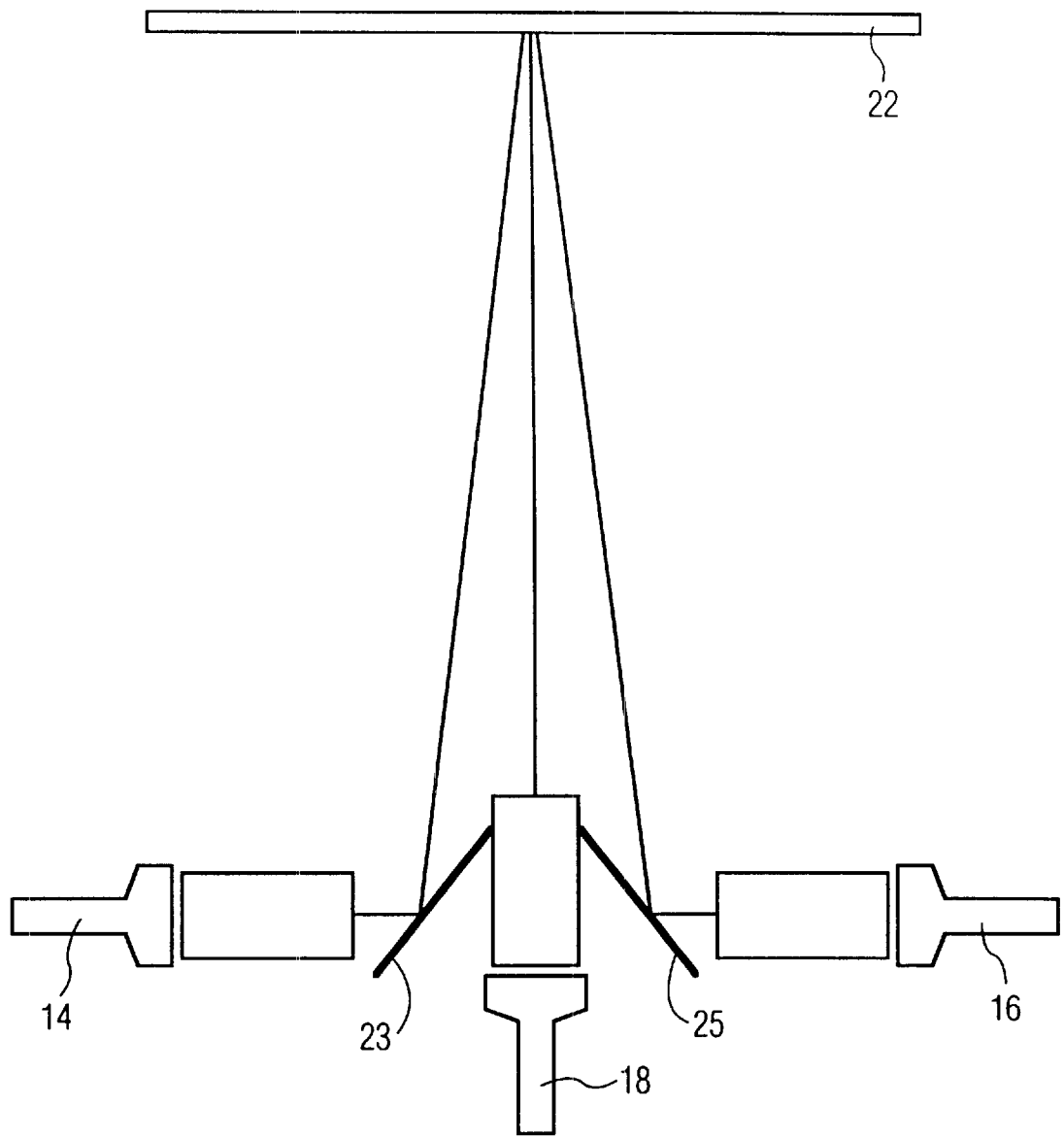
FIG. 28 is a diagrammatic representation of another alternative embodiment of the optical system used in connection with the projection television of the present invention.

In some instances, the effective indices of refraction for the red, green, and blue images are very different. In these cases, the required step size may be so large (and corresponding input angles so small) as to cause one projection assembly to effectively block a rearwardly adjacent projection assembly. In a further embodiment, shown in FIG. 28, projection cathode ray tube assembly 18 (red) is placed in the center (shortest light path requirement), with projection cathode ray tube assemblies 14 (blue) and 16 (green) positioned adjacent to projection cathode ray tube assembly 18, with their respective images being reflected off of mirrors 23 and 25 so as to be directed toward screen 22. In such an arrangement, the mirrors would establish the convergence angle for the blue and green images. The size of the cabinet for the television is required to be slightly less deep in this embodiment of the invention, since the red light path length is slightly less than the green and blue path lengths. Another advantage of this embodiment is that each mirror acts as a "virtual CRT" which may be positioned closer to the real central CRT (projection cathode ray tube assembly 18) than is normally realizable. This has the effect of reducing the convergence angle, color shift correction requirements, and convergence power.

Figure 29:
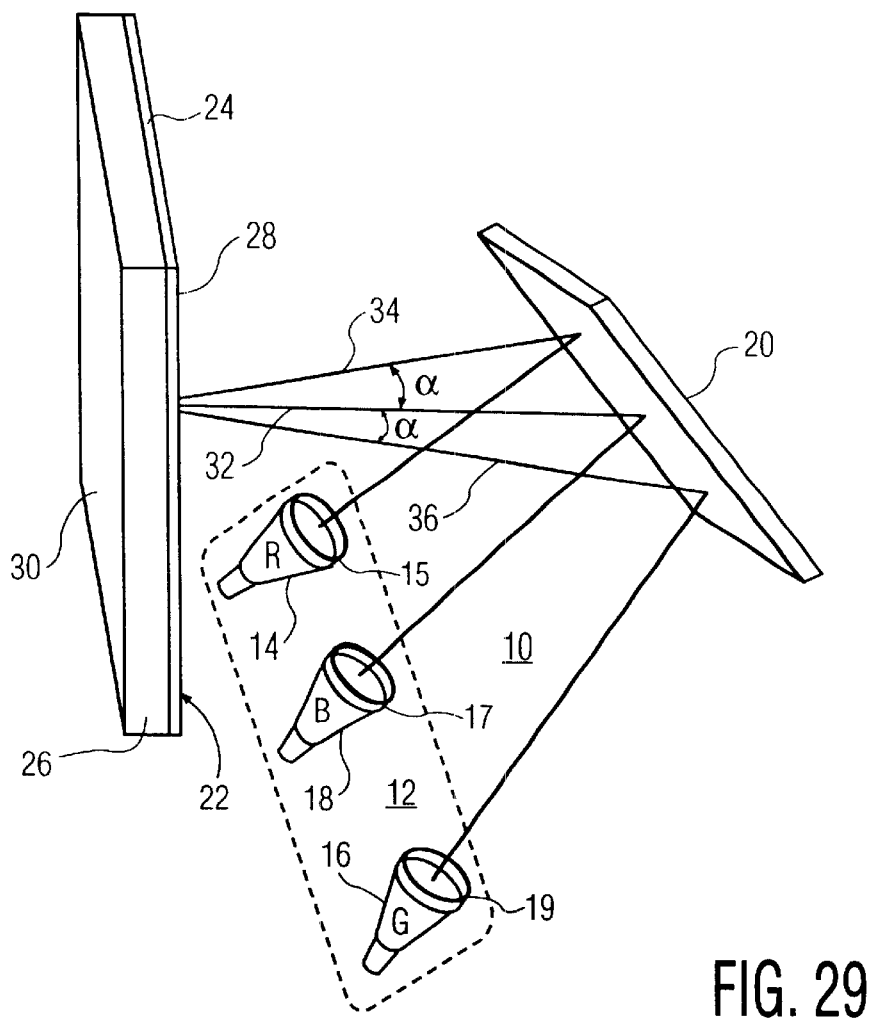
FIG. 29 is a diagrammatic representation of a projection television in accordance with the inventive arrangements taught herein.

Another embodiment of projection television receiver 10 is illustrated in FIG. 29. An array 12 of projection cathode ray tubes 14, 16 and 18 provide red, green and blue images respectively. The cathode ray tubes are provided with respective lenses 15, 17 and 19. The projected images are reflected by a mirror 20 onto a projection screen 22. Additional mirrors can also be utilized, depending on the particular geometry of the optical paths. The blue cathode ray tube 18 projects the blue image along an optical path 32, which has a substantially orthogonal orientation with screen 22. In other words, the optical path is at right angles to the screen. The red and green cathode ray tubes have respective optical paths 34 and 36, which converge toward the first optical path 32 in a non orthogonal orientation defining angles of incidence α. The angles of incidence introduce the problem of color shift.

Figure 30:
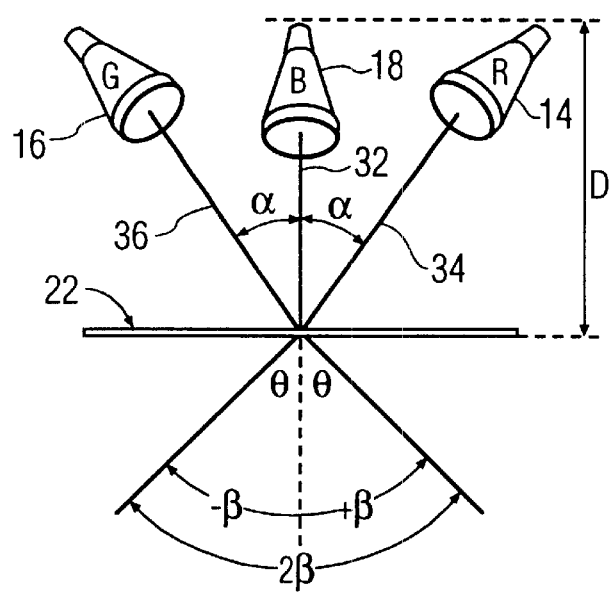
FIG. 30 is a simplified diagram of projection television geometry useful for explaining the inventive arrangements.

FIG. 30 is a simplified projection television diagram, omitting the mirror and lenses, for explaining color shift performance of the projection television receiver 10 illustrated in FIG. 29. The optical axes 34 and 36 of the red and green cathode ray tubes 14 and 18 are aligned symmetrically at angles of incidence a with respect to the optical axis 32 of the blue cathode ray tube 18. The minimum depth D of a cabinet is determined by the distance between the screen 22 and the rear edges of the cathode ray tubes. It will be appreciated that as the angle α becomes smaller, the cathode tubes move closer together, and must be spaced further from the screen to avoid hitting one another. At a sufficiently small angle α, such interference cannot be avoided. This undesirably increases the minimum depth D of a cabinet. Conversely, as the angle α gets larger, the cathode ray tubes can be moved closer to the screen 22, reducing the minimum depth D of a cabinet.

Traditional projection television designs place the green projection tube in the center of the array of three tubes. This generally provides the best resolution for the color most noticeable to the human eye in systems using lenticular or fresnel projection screens. In order to produce the color white, all three projection tubes are illuminated at full intensity. In order to produce white, such typical projection television systems require relatively large electrical currents for the green and blue projection tubes and relatively lower electrical current for the red tube. The particular color temperature of the system largely depends on the electrical current delivered to the green and blue projection tubes.

Figure 31:
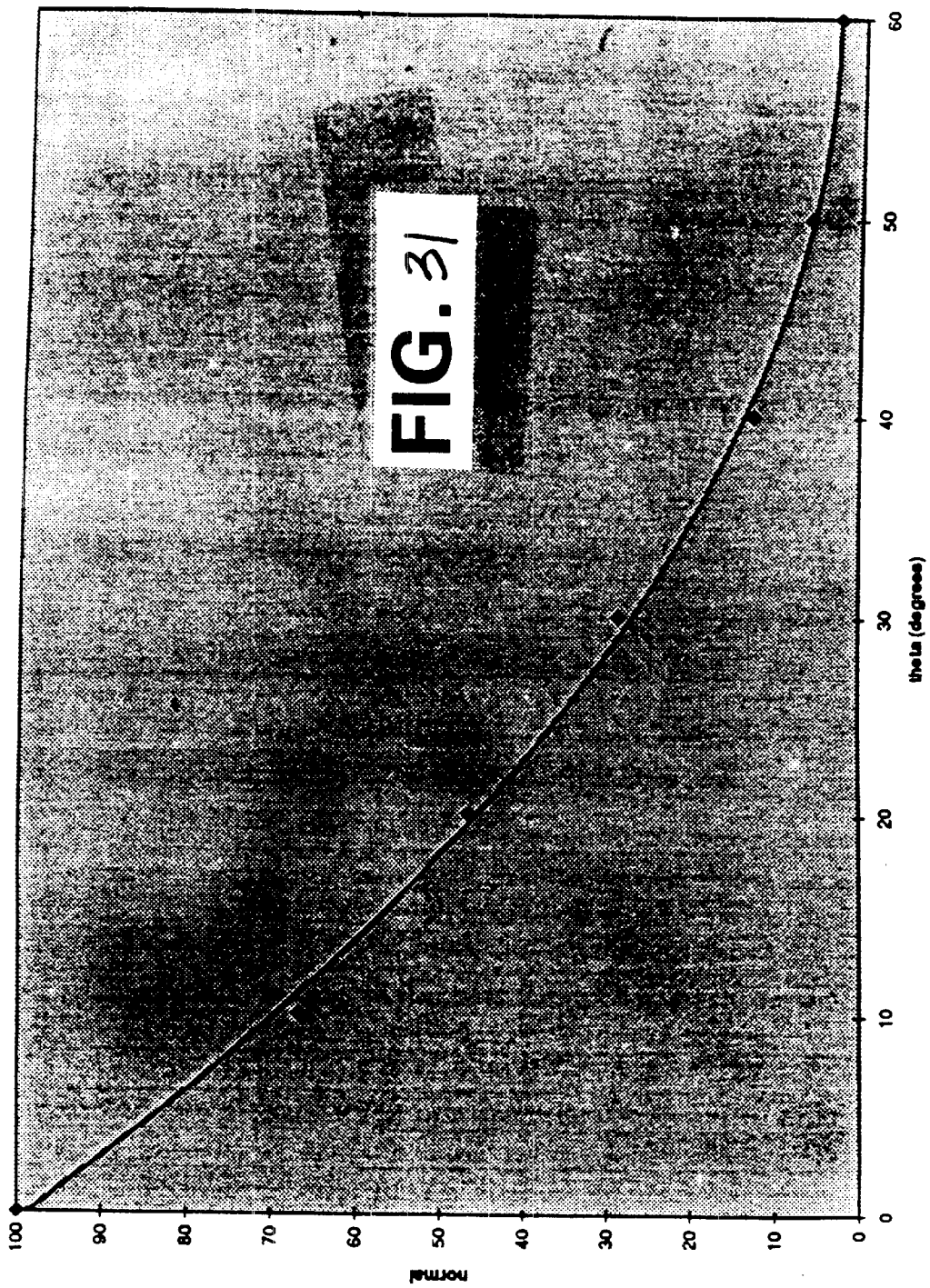
FIG. 31 is a graphic representation of the normalized brightness as a function of horizontal viewing angle, using a holographic element screen in accordance with the invention.

According to an inventive aspect herein, a holographic projection system is provided wherein the projection tube with the highest current requirement, namely the blue projection tube, is placed at the center of the projection array, rather than the green tube. In combination with a holographic element screen, this provides several advantages which are contrary to the teachings of the prior art. FIG. 31 shows a graphic representation of the normalized brightness as a function of horizontal viewing angle, using a holographic element screen in accordance with the invention. The holographic screen has a controlled input angle characteristic unlike a lenticular or fresnel based screen. Even for horizontal viewing angles of a few degrees from normal or orthogonal, the input is attenuated (i.e., not as efficiently transmitted through the screen as light at zero degrees). Placement of the blue projection tube in the center of the projection array allows for equalization of the current delivered to the blue and green projection tubes while still providing acceptable color temperature.

For example, in an conventional 46" projection television system using a lenticular screen rather than a hologram screen, the ratio of green light output to blue light output was measured as 9.4. The lenticular was removed and a holographic screen in accordance with the invention was inserted into the projection television system. The ratio of green light output to blue light output was measured as 10.1. Thus, there is a potential for 6–7% more light output from the blue projection tube if the blue tube is moved to the zero degree location (center) and a potential for 6–7% less light output from the green CRT if the green CRT is moved to the conventional blue location.

Figure 32:
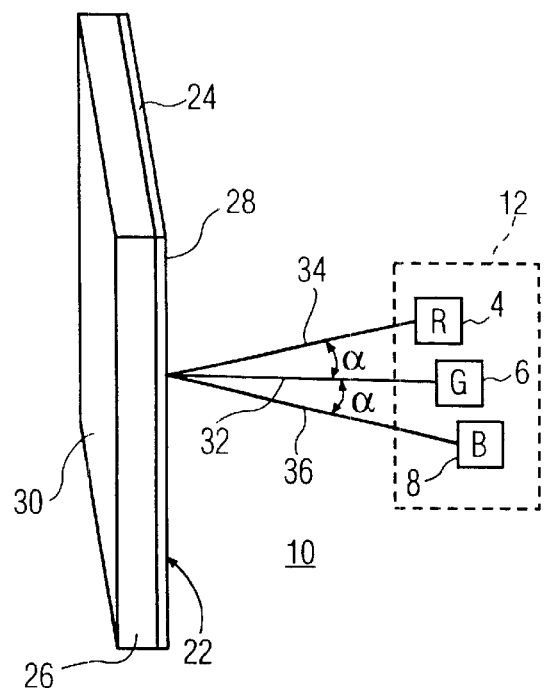
FIG. 32 is a diagrammatic representation of a projection television in accordance with the inventive arrangements taught herein.
Figure 34:
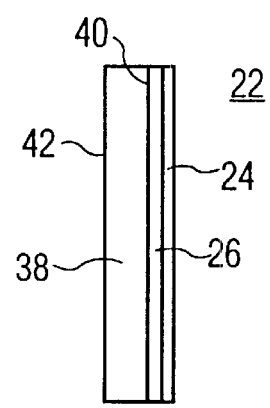
FIG. 34 is a side elevation of a reinforced projection screen according to the inventive arrangements.

In another embodiment of the projection television receiver 10, illustrated in FIG. 32, an array 12 of projectors 4, 6, and 8 provide red, green and blue images respectively. The projectors are provided with cathode ray tubes with angular lenses for directing a images onto screen 22, shown in FIG. 34, without the need for a large reflecting mirror (see FIG. 35). The green projector 6 projects the green image along an optical path 32, which has a substantially orthogonal orientation with screen 22. In other words, the optical path is at right angles to the screen. The red and blue projectors have respective optical paths 34 and 36, which converge toward the first optical path 32 in a non orthogonal orientation defining angles of incidence α. The angles of incidence introduce the problem of color shift.

Figure 33:
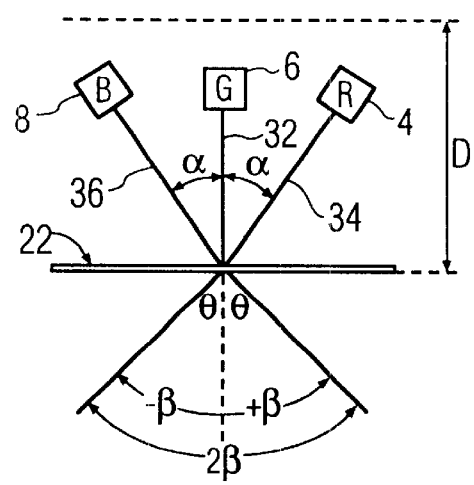
FIG. 33 is a simplified diagram of projection television geometry useful for explaining the inventive arrangements.

FIG. 33 is a simplified projection television diagram, omitting the mirror and lenses, for explaining color shift performance. The optical axes 34 end, 36 of the red and blue projectors 4 and 8 are aligned symmetrically at angles of incidence α with respect to the optical axis 32 of the green projector 6. The minimum depth D of a cabinet is determined by the distance between the screen 22 and the rear edges of one or more of the projectors. It will be appreciated that as the angle α becomes smaller, the cathode ray tubes move closer together, and must be spaced further from the screen to avoid hitting one another. At a sufficiently small angle α, such interference cannot be avoided. This undesirably increases the minimum depth D of a cabinet. Conversely, as the angle α gets larger, the cathode ray tubes can be moved closer to the screen 22, reducing the minimum depth D of a cabinet.

Figure 35:
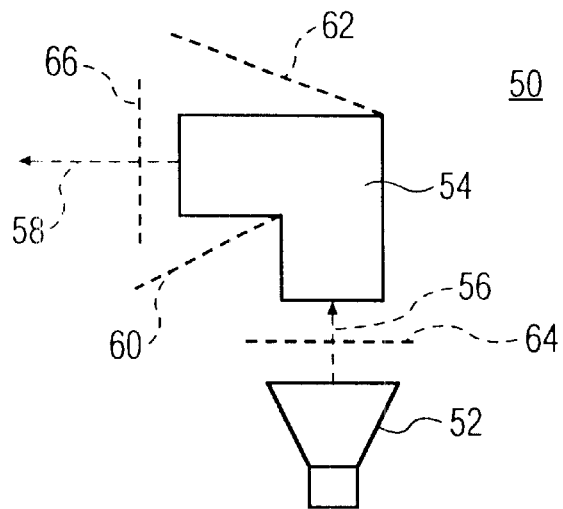
FIG. 35 is a diagrammatic representation of an image projector having a cathode ray tube and an angled lens according to the inventive arrangements.

FIG. 35 shows a diagrammatic representation of an image projector 50 having a cathode ray tube 52 and an angled lens 54 in accordance with the invention. The cathode ray tube generates light which travels in the direction of arrow 56 into angled lens 54. Angled lens 54 redirects the light from the cathode ray tube for projection onto the screen as shown by arrow 58. The angled lens 54 is show as generally providing a right angle redirection of light. In the alternative, angled lens can redirect light from the cathode ray tube by more or less than 45° as shown by arrows 60 and 62 respectively. Intermediate lenses 64 are 66 can be provided to collect and/or spread the light from the cathode ray tube.

FIGS. 36–39 show various cabinet configurations now made possible by using image projectors with an angled lenses in combination with a holographic element screen. These configurations will require a relatively large angle of incidence α to provide space for the image projectors. In combination with the holographic element screen these cabinet configurations represent commercially acceptable projection television receivers some of which may have angles of incidence up to about 30°.

Figure 36:
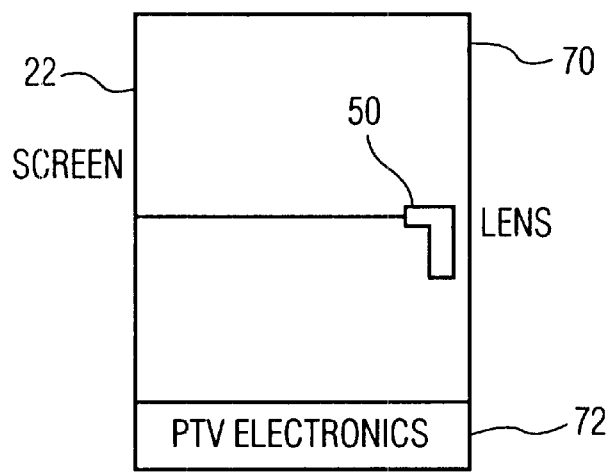
FIG. 36 is a diagrammatic representation of a projection television system installed in a cabinet having storage for electronics within the lower portion of the cabinet body.

FIG. 36 shows a diagrammatic representation of a projection television system installed in a cabinet 70 having a lower storage area 72 for storage of electronics within the lower portion of the cabinet body. Image projector 50 and its associated cathode ray tube and angled lens (not shown) project an image directly onto screen 22 without the need for a large mirror. In general, large mirrors are expensive to manufacture and are somewhat difficult to mount and align within a projection television cabinet. The configuration shown in FIG. 36 eliminates the need for a large mirror and moves the image projectors higher within the cabinet 70 as compared to systems using a large mirror to reflect an image produced from a cathode ray tube. This provides increased space for lower storage area 72 in the base of the cabinet 72.

Figure 37:
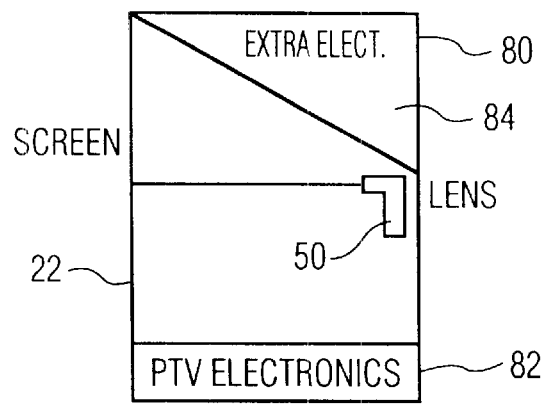
FIG. 37 is a diagrammatic representation of an alternate embodiment projection television system installed in a cabinet having storage for electronics within the upper and lower cabinet body.

FIG. 37 shows a diagrammatic representation of a projection television system installed in a cabinet 80 having a lower storage area 82 for storage of electronics within the lower portion of the cabinet body and an upper storage area 84 for storage of electronics within the upper portion of the cabinet body. This configuration makes maximum usage of the space within cabinet 80 for projection television systems which require large volumes of space for sophisticated supporting electronics.

Figure 38:
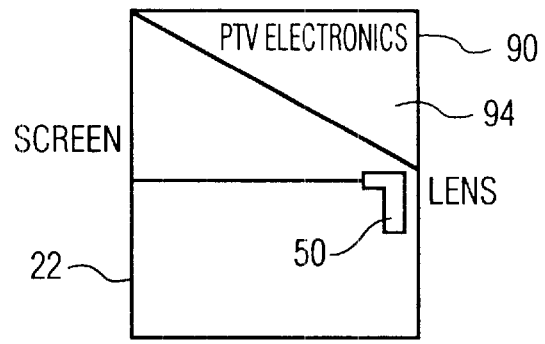
FIG. 38 is a diagrammatic representation of an alternate embodiment projection television system installed in a cabinet having storage for electronics within the upper cabinet body.

FIG. 38 shows a diagrammatic representation of a projection television system installed in a cabinet 90 having an upper storage area 94 for storage of electronics within the upper portion of the cabinet body. This configuration minimizes the height of the cabinet by eliminating unused space at the base of the cabinet 90.

Figure 39:
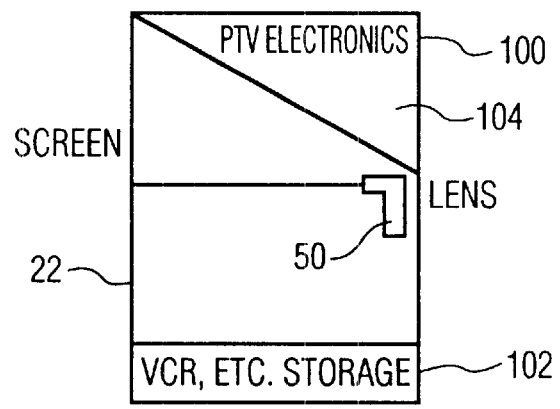
FIG. 39 is a diagrammatic representation of an alternate embodiment projection television system installed in a cabinet having storage for electronics within the upper cabinet body and general storage in the lower portion of the cabinet body.

FIG. 39 shows a diagrammatic representation of a projection television system installed in a cabinet 100 having a lower storage area 102 for general storage (e.g., VCR, tapes, etc.) within the lower portion of the cabinet body and an upper storage area 104 for storage of electronics within the upper portion of the cabinet body.

According to another inventive aspect, it is desirable to provide a holographic element screen with a gain roughly twice that of a lenticular (e.g., fresnel) screen. Typical lenticular screens have a gain in the range of 5 to 7 and a horizontal half viewing angle in the range of ±37° to ±42°. Holographic element screens in accordance with the invention preferably have a gain of at least 12 and preferably have a gain in the range of 12 to 18. Due to this gain, the horizontal half viewing angle of the preferred holographic element screen need only be in the range of ±22° to ±32°, and nevertheless retains adequate brightness at a wider range of viewing angles, typically up to ±50° or more.

The following table represents data obtained in testing various holographic screen samples in accordance with the invention at a vertical viewing angle of 6°.

| Horizontal Viewing Angle | SAMPLE #74 Brightness White ft-L | SAMPLE #76 Brightness White ft-L |
|---|---|---|
| −60 | 9.0 | 4.0 |
| −50 | 18.3 | 9.2 |
| −40 | 33.2 | 18.7 |
| −30 | 53.2 | 39.2 |
| −20 | 76.3 | 87.6 |
| −10 | 80.6 | 1202 |
| 0 | 76.8 | 110.7 |
| 10 | 79.1 | 120.5 |
| 20 | 61.5 | 65.0 |
| 30 | 39.7 | 26.3 |
| 40 | 24.6 | 11.4 |
| 50 | 14.7 | 5.4 |
| 60 | 8.2 | 2.4 |

Figure 40:
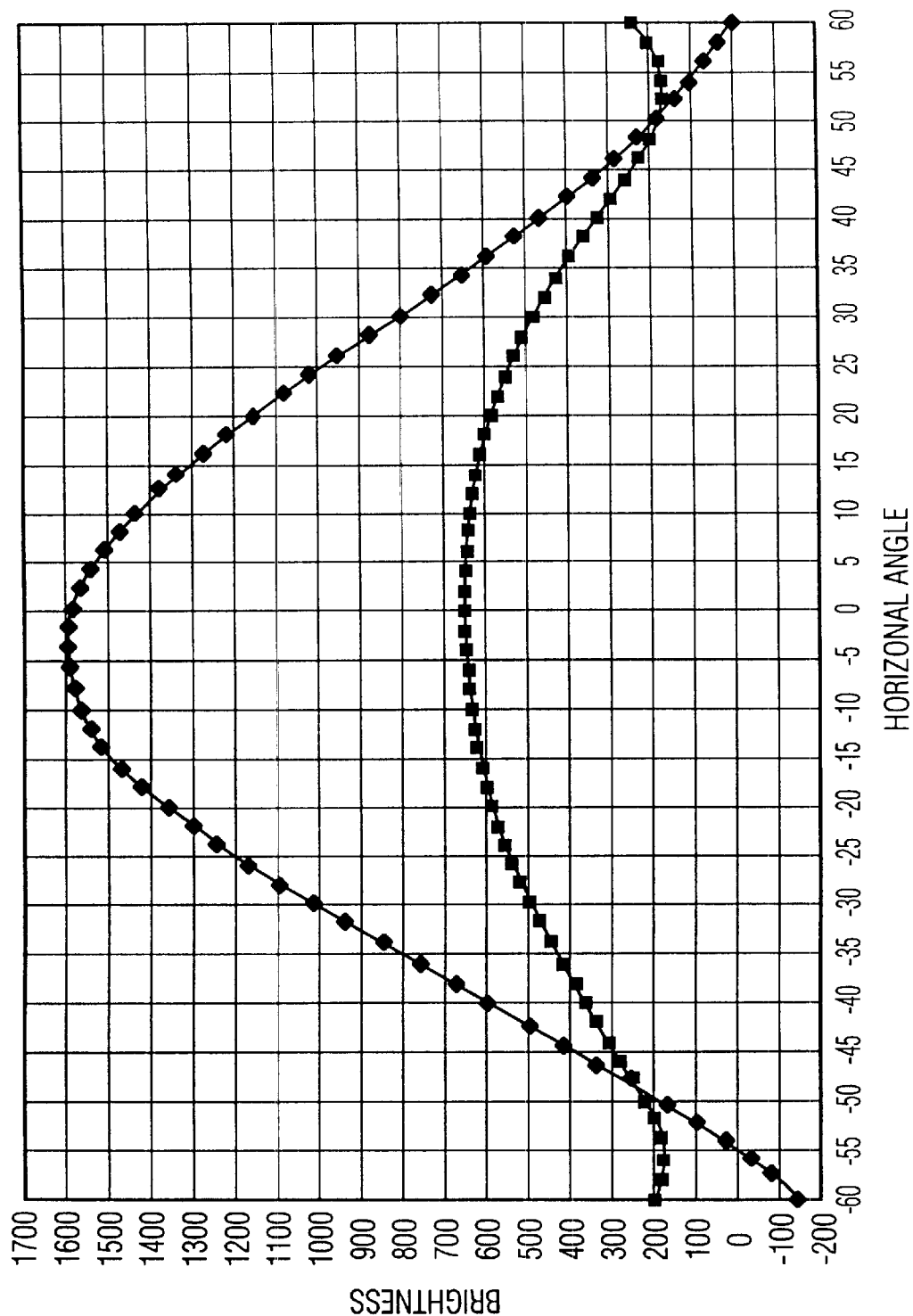
FIG. 40 is a graphic representation of the brightness as a function of horizontal viewing angle, using a holographic element screen in accordance with the invention and a lenticular screen consistent with the prior art.

FIG. 40 graphically shows the difference in performance between a holographic element screen in accordance with the invention and a comparable lenticular screen. The upper curve represents the brightness of a holographic element screen plotted with respect to horizontal viewing angle. The data points for the upper curve are a normalized representation of the data from the previous table. The lower curve represents the brightness of a typical lenticular (e.g., fresnel) screen plotted with respect to horizontal viewing angle. The data points for the lower curve were measured similarly to the upper curve and likewise normalized, for comparison of the half brightness angles achieved. The vertical axis in FIG. 40 represents brightness calibrated in arbitrary units although the relationship between the two curves has been preserved in normalizing the data for each of the screens.

With respect to the holographic element screen, the horizontal half viewing angle as shown in FIG. 40 is approximately 27.5° as compared to a half viewing angle of 39.5° for the lenticular screen. Despite the apparently poor horizontal half viewing angle the holographic element screen provides improved performance (i.e., an increase in the light delivered) over a range of −48° to +50° as compared to a lenticular screen.

The invention now having been disclosed in connection with the foregoing exemplary embodiments, additional embodiments will now be apparent to persons skilled in the art. The invention is not intended to be limited to the embodiments specifically mentioned, and accordingly reference should be made to the appended claims rather than the foregoing discussion, to assess the spirit and scope of the invention in which exclusive rights are claimed.

What is claimed is:

1. A projection television, comprising:
   a plurality of image projectors (14, 16, 18) for respective images of different colors;
   a projection screen (22) having at least one holographic element (26) disposed on a substrate (24) superimposed on at least one light transmissive panel (38), said screen (22) receiving images from said projectors (14, 16, 18) on a first side and displaying said images on a second side with controlled light dispersion of said displayed images; and,
   said holographic element controlling said light dispersion so as to maximize peak center gain, whereby brightness levels over a predetermined range of horizontal viewing angles are higher than would be predicted by the ½ brightness angle of said screen.

2. The projection television of claim 1, wherein the screen (22) has a gain in the range of at least 12 to 18.

3. The projection television of claim 1, wherein the predetermined range of horizontal viewing angles is approximately ±22° to ±50°.

4. The projection television of claim 1, wherein said projection screen (22) has a plurality of holographic elements (26) representing a three dimensional array of lenticular elements having a configuration effective for reducing color shift in said displayed images, said screen (22) having a color shift less than or equal to approximately 5 for all angles of incidence in a range greater than 0° and less than or equal to approximately 30°, as determined by the maximum value obtained from at least one of the following expressions:

$$C(\Theta) = 20 \cdot \log_{10}\left(\frac{red(\Theta)}{blue(\Theta)}\right);$$

$$C(\Theta) = 20 \cdot \log_{10}\left(\frac{green(\Theta)}{blue(\Theta)}\right)$$

where $\Theta$ is any angle within a range horizontal viewing angles, $C(\Theta)$ is the color shift at angle $\Theta$, red ($\Theta$) is the red luminance level at angle $\Theta$, blue ($\Theta$) is the blue luminance level at angle $\Theta$ and green ($\Theta$) is the green luminance level at angle B.

5. The projection television of claim 4, wherein the color shift of said projection screen (22) is less than or equal to approximately 4 for all said angles of incidence.

6. The projection television of claim 4, wherein the color shift of said projection screen (22) is less than or equal to approximately 3 for all said angles of incidence.

7. The projection television of claim 4, wherein the color shift of said projection screen (22) is less than or equal to approximately 2 for all said angles of incidence.

8. The projection television of claim 4, wherein:
   the color shift of said screen (22) is less than or equal to approximately 2 for all said angles of incidence in a first subrange of angles of incidence greater than 0° and less than or equal to approximately 10°; and,
   the color shift of said screen (22) is less than or equal to approximately 5 for all said angles of incidence in a second subrange of angles of incidence greater than approximately 10° and less than or equal to approximately 30°.

9. The projection television of claim 1, wherein said at least one light transmissive panel comprises a light transmissive reinforcing member (38).

10. The projection television of claim 9, wherein said at least one light transmissive panel comprises an acrylic, light transmissive reinforcing member (38).

11. The projection television of claim 1, wherein said substrate (24) comprises a highly durable, transparent, water-repellent film.

12. The projection television of claim 11, wherein said film comprises a polyethylene terephthalate resin film.

13. The projection television of claim 11, wherein said film has a thickness in the range of approximately 1–10 mils.

14. The projection television of claim 1, wherein said at least one holographic element (26) comprises a photo polymer material disposed on said substrate (24).

15. The projection television of claim 9, wherein said at least one holographic element (26) comprises a photo polymer material disposed on said substrate (24).

16. The projection television of claim 10, wherein said at least one holographic element (26) comprises a photo polymer material disposed on said substrate (24).

17. The projection television of claim 11, wherein said at least one holographic element (26) comprises a photo polymer material disposed on said substrate (24).

18. The projection television of claim 12, wherein said at least one holographic element (26) comprises a photo polymer material disposed on said substrate (24).

19. The projection television of claim 13, wherein said at least one holographic element (26) comprises a photo polymer material disposed on said substrate (24).

20. The projection television of claim 1, further comprising a mirror (20) between said image projectors (14, 16, 18) and said screen (22).

21. The projection television of claim 1, in which said holographic element (26) has the following performance specifications:

Horizontal half viewing angle: 38°±3°

Vertical half viewing angle: 10°±1°

Screen gain: ≧8

Color shift: ≦3.

22. A method for increasing brightness levels in a projection television having a plurality of image projectors (14, 16, 18) for respective images of different colors and a holographic screen (22) receiving images from said projectors (14, 16, 18) on a first side and displaying said images on a second side, comprising the steps of:

defining a predetermined range of horizontal viewing angles for said screen; and, holographically controlling light dispersion of said displayed images to maximize peak center gain, whereby brightness levels over said predetermined range of horizontal viewing angles are higher than would be predicted by the ½ brightness angle of said screen.

23. The method of claim 22, comprising the step of predetermining said range of horizontal viewing angles as at least ±22° to ±50°.

24. The method of claim 22, controlling said light dispersion to a peak center gain of at least 12 to 18.

25. The method of claim 23, controlling said light dispersion to a peak center gain of at least 12 to 18.

* * * * *